(12) United States Patent
Stovicek et al.

(10) Patent No.: US 9,154,605 B2
(45) Date of Patent: Oct. 6, 2015

(54) METHOD AND APPARATUS FOR POSTING DATA TO A PLURALITY OF ACCOUNTS

(75) Inventors: Thomas Jan Stovicek, Redwood City, CA (US); Henry Yao-Tsu Chen, Waterloo (CA); Andrew Philip Cundill, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 602 days.

(21) Appl. No.: 13/091,812

(22) Filed: Apr. 21, 2011

(65) Prior Publication Data

US 2011/0265017 A1    Oct. 27, 2011

Related U.S. Application Data

(60) Provisional application No. 61/327,254, filed on Apr. 23, 2010.

(51) Int. Cl.
| | |
|---|---|
| *H04M 1/725* | (2006.01) |
| *G06Q 10/10* | (2012.01) |
| *G06Q 50/00* | (2012.01) |

(Continued)

(52) U.S. Cl.
CPC ........... *H04M 1/72547* (2013.01); *G06Q 10/10* (2013.01); *G06Q 50/01* (2013.01); *G06F 3/0482* (2013.01); *G06F 3/04817* (2013.01); *G06F 3/04842* (2013.01); *H04L 12/5895* (2013.01); *H04L 65/403* (2013.01); *H04L 67/26* (2013.01); *H04M 1/72583* (2013.01)

(58) Field of Classification Search
CPC . H04L 65/403; G06F 3/0482; G06F 3/04842; G06F 3/04817
USPC .................................................. 715/751–753
See application file for complete search history.

(56) References Cited

U.S. PATENT DOCUMENTS

| | | | |
|---|---|---|---|
| 7,197,531 | B2 | 3/2007 | Anderson |
| 7,673,327 | B1 | 3/2010 | Polis et al. |

(Continued)

FOREIGN PATENT DOCUMENTS

| | | |
|---|---|---|
| WO | 2008082794 A2 | 7/2008 |
| WO | 2008100893 A1 | 8/2008 |

(Continued)

OTHER PUBLICATIONS

Jegal et al, U.S. Appl. No. 61/303,505, filed Feb. 11, 2010.*

(Continued)

*Primary Examiner* — Tuyetlien Tran
(74) *Attorney, Agent, or Firm* — Fish & Richardson P.C.

(57) ABSTRACT

The present specification provides a method, system and apparatus for posting data to a plurality of accounts at a plurality of remote servers. A display is controlled to generate a message region for receiving message data to be posted to at least a subset of the plurality of accounts. The display is controlled to generate icons, associated with the plurality of accounts, in a one-to-one relationship, the icons provided adjacent to the message region, each icon comprising: a first respective indicator of a respective account; a second respective indicator of a service associated with the account; and a respective picture. Icons are selected and the display is controlled to provide an indicator of selection at each of the selected icons. Message data is transmitted to each of the plurality of accounts associated with each of the icons which are selected via the communication subsystem.

24 Claims, 18 Drawing Sheets

(51) Int. Cl.

| | |
|---|---|
| H04L 29/06 | (2006.01) |
| G06F 3/0481 | (2013.01) |
| G06F 3/0484 | (2013.01) |
| G06F 3/0482 | (2013.01) |
| H04L 12/58 | (2006.01) |
| H04L 29/08 | (2006.01) |

(56) References Cited

U.S. PATENT DOCUMENTS

| | | | |
|---|---|---|---|
| 7,751,807 B2 | 7/2010 | Lin et al. | |
| 2002/0094806 A1 | 7/2002 | Kamimura | |
| 2004/0172415 A1* | 9/2004 | Messina et al. | 707/104.1 |
| 2005/0001904 A1 | 1/2005 | Kiiskinen | |
| 2005/0137015 A1 | 6/2005 | Rogers et al. | |
| 2005/0250548 A1 | 11/2005 | White | |
| 2006/0095530 A1* | 5/2006 | Daniell et al. | 709/206 |
| 2007/0094418 A1 | 4/2007 | Reisman | |
| 2007/0100648 A1 | 5/2007 | Borquez et al. | |
| 2008/0108299 A1 | 5/2008 | Hullot | |
| 2008/0194276 A1 | 8/2008 | Lin et al. | |
| 2008/0195712 A1 | 8/2008 | Lin et al. | |
| 2008/0195962 A1 | 8/2008 | Lin et al. | |
| 2008/0299997 A1* | 12/2008 | Klassen et al. | 455/466 |
| 2008/0301175 A1 | 12/2008 | Applebaum | |
| 2009/0031232 A1 | 1/2009 | Brezina et al. | |
| 2009/0144639 A1 | 6/2009 | Nims et al. | |
| 2009/0228807 A1* | 9/2009 | Lemay | 715/752 |
| 2009/0271712 A1 | 10/2009 | Ligh et al. | |
| 2009/0271778 A1 | 10/2009 | Mandyam et al. | |
| 2009/0307603 A1 | 12/2009 | Gowda et al. | |
| 2010/0011422 A1 | 1/2010 | Mason et al. | |
| 2010/0016003 A1 | 1/2010 | Shapiro et al. | |
| 2010/0070899 A1* | 3/2010 | Hunt et al. | 715/769 |
| 2010/0106782 A1 | 4/2010 | Huang et al. | |
| 2010/0121831 A1 | 5/2010 | Lin et al. | |
| 2010/0125584 A1 | 5/2010 | Navas | |
| 2010/0144328 A1 | 6/2010 | Keating et al. | |
| 2010/0268584 A1* | 10/2010 | Pullur et al. | 705/14.16 |
| 2010/0274847 A1* | 10/2010 | Anderson et al. | 709/203 |
| 2011/0026704 A1 | 2/2011 | Connelly et al. | |
| 2011/0053578 A1* | 3/2011 | Rochford | 455/418 |
| 2011/0078111 A1* | 3/2011 | Scott et al. | 707/610 |
| 2011/0087732 A1 | 4/2011 | Lakshmanan et al. | |
| 2011/0125765 A1 | 5/2011 | Tuli | |
| 2011/0173238 A1* | 7/2011 | Griggs | 707/805 |
| 2011/0197163 A1* | 8/2011 | Jegal et al. | 715/811 |
| 2011/0225539 A1* | 9/2011 | Lee et al. | 715/784 |
| 2011/0227810 A1* | 9/2011 | McKinney et al. | 345/1.3 |
| 2011/0238755 A1* | 9/2011 | Khan et al. | 709/204 |
| 2011/0258016 A1* | 10/2011 | Barak et al. | 705/7.29 |
| 2011/0321129 A1* | 12/2011 | Kinsel et al. | 726/4 |

FOREIGN PATENT DOCUMENTS

| | | |
|---|---|---|
| WO | 2009023982 A1 | 2/2009 |
| WO | 2010001182 A2 | 1/2010 |

OTHER PUBLICATIONS

Amit Agarwal, "Publish the Same Blog Post to Multiple Blogging Sites at Once", publicly available on Oct. 14, 2008.*
http://www.softpedia.com/get/Multimedia/Graphic/Graphic-Viewers/Universal-Viewer-Pro.shtml Downloaded from the Internet on May 25, 2011.
Universal Viewer, GooglePreview, and Cool Previews, downloaded from http://www.findmysoft.com/news/Universal-Viewer-GooglePreview-and-CoolPreviews/ Downloaded from the Internet on Oct. 11, 2009.
List of portable software—Wikipedia, downloaded from http://en.wikipedia.org/wiki/List_of_portable_software Downloaded from the Internet on Nov. 10, 2009.
http://www.svpocketpc.com/reviews/listpro4/ListPro4.html Downloaded from the Internet on May 25, 2011.
http://media.wbpsystems.com/torch_mobile_book.pdf Downloaded from the Internet on Jun. 2, 2011.
http://duncsweb.com/2009/12/07/review-snaptu-twitter-facebook-rss-google-calendar-flickr-tv-movies-picasa-more-on-your-mobile-device/ Downloaded from the Inernet on Jun. 2, 2011.
http://www.macworld.com/appguide/app.html?id=86956 Downloaded from the Internet on Jun. 2, 2011.
http://www.makeuseof.com/dir/combine-multiple-feeds/ Downloaded from the Internet on Jun. 2, 2011.
http://mobile.engadget.com/2009/03/23/socialscope-for-blackberry-impressions-and-invites/ Downloaded from the Internet on May 25, 2011.
http://mashable.com/2008/07/15/twhirl-tweetdeck-comparison/ Downloaded from the Internet on May 25, 2011.
http://en.wikipedia.org/wiki/Ping.fm Downloaded from the Internet on May 25, 2011.
http://mashable.com/2009/08/05/twitter-blackberry-clients/ Ubertwitter Downloaded from the Internet on May 25, 2011.
http://www.ifreeware.net/download-listening-to--share-what-you-are-listening-to-on-facebook-twitter.html Downloaded from the Internet on Mar. 13, 2011.
Seesmic for iPhone http://blog.seesmic.com/2010/05/introducing-seesmic-for-iphone-1.html Downloaded from the Internet on Mar. 13, 2011.
http://www.twitip.com/manage-your-messages-on-dozens-of-social-networking-serviced-at-once-with-pingfm/ Downloaded from the Internet on Mar. 13, 2011.
Atomkeep syncs profile information across multiple services Downloaded from the Internet on Apr. 20, 2010.
Technotraits.com 7+ Websites That Upload Files to Multiple File sharing Sites at Once Downloaded from the Internet on Apr. 20, 2010.
Ubergizmo.com JOGGLE: Manage Your Media Files Across Multiple Devices and Websites Downoaded from the Internet on Apr. 20, 2010.
Betadaily.com Upload Photos and Videos to Multiple Websites at Once From Computer and Mobile Phone Downloaded from the Internet on Apr. 20, 2010.
Etiole.com Upload Images to Multiple site at once through PhotoScatter iPhone app Downloaded from the Internet on Apr. 20, 2010.
Pingfm.pbworks.com Ping.fm Help and Information Wiki : Posting Photos Downloaded from the Internet on Apr. 20, 2010.
Extended European Search report mailed Dec. 20, 2011, in corresponding European patent application No. 11163220.4.
Extended European Search Report dated Oct. 12, 2011. In corresponding application No. 11163385.5.
HootSuite:"Hootsuite iphone App", You tube Website. Dec. 3, 2009, XP002659577, Retrieved from the internet: URL: http://www.youtube.com/watch?v=-YwC3PXB_Ns&feature=player_embedded [retrieved on Sep. 21, 2011].
Chris, Trottier, "Announcing Hootsuite for iphone", HootSuite Blog, Dec. 9, 2009, XP002659576,Retrieved from the Internet: URL:http:// blog.hootsuite.com/announcing-hootsuite-for-iphone/ [retrieved on Sep. 21, 2011].
Krista Graham: "Techmatters: Hear the Librarian Go Twee, Tweet, Tweet: Beyond the Basics (Party II)", Loex Clearinghouse for Library Instruction, vol. 36, No. 4 , Feb. 1, 2010, pp. 6-7, 10, XP002659664, LOEX Clearinghouse, 109 Halle Library, Eastern Michigan University, Ypsilanti, MI 48197-2207 ISSN:1547-0172, Retrieved from the internet: URL:http://commons.emich.edu/cgi/viewcontent.cgi?article=1003&context=loexquarterly [retrieved on Sep. 22, 2011] p. 10.
Extended European Search Report mailed Nov. 15, 2011. In European application No. 11163229.5.
Upload Videos to Multiple Video Sharing Websites in One Shot with TubeMogul; http://wwwblogsdna.com/3029/tubemogul-lets-you-to-upload-videos-to-multiple-video-shot; published on Apr. 20, 2009 and retrieved on Apr. 20, 2010.

(56) References Cited

OTHER PUBLICATIONS iPhone Apps—Facebook 2.0—YouTube; http://www.youtube.com/watch?v+p81ZmLmwr; Uploaded on Nov. 11, 2008 and retrieved on May 13, 2013.

iPhone sliding menu (facebook style)—You Tube ; http://www.youtube.com/watch?v=wFqBNXZ4SHI ; Uploaded Nov. 16, 2008 and retrieved on May 13, 2013.

MWC: Microsoft debuts Windows Phone 7 Series—YouTube; http://www.youtube.com/watch?v=8dM4X-KveSs; Uploaded Feb. 15, 2010 and retrieved on May 13, 2013.

Socialite—All your social network in one application; http://web.archive.org/web/20091209042048; http://www.realmacsoftware.com/socialite/; retrieved on May 29, 2013.

Non-Final Office Action mailed Feb. 5, 2013, in corresponding U.S. Appl. No. 13/090,568.

Examination report mailed Jul. 12, 2013, in corresponding European patent application No. 11163385.5.

Darrell, Etherington; TweetDeck for iPhone Gets Facebook Intergration, Nov. 17, 2009, Retrieved from the Internet: URL: http://gigaom.com/2009/11/17/tweetdeck-for-iphone-gets-facebook-integration/ [retrieved on Apr. 22, 2013].

* cited by examiner

METHOD AND APPARATUS FOR POSTING DATA TO A PLURALITY OF ACCOUNTS

CROSS-RELATED APPLICATIONS

This application claims the benefit of U.S. Provisional Application No. 61/327,254, filed on Apr. 23, 2010 which is incorporated herein by reference in its entirety.

FIELD

The present specification relates generally to computing devices and more particularly relates to a method and apparatus for posting data to a plurality of accounts.

BACKGROUND

The evolution of computers is currently quite active in the mobile device environment. It is now well-known to including news feed applications and posting applications in mobile devices. More recently, however, there has been a veritable explosion of the number and type of applications that are configured to the unique form factors and computing environments of mobile devices.

BRIEF DESCRIPTION OF THE DRAWINGS

For a better understanding of the various implementations described herein and to show more clearly how they may be carried into effect, reference will now be made, by way of example only, to the accompanying drawings which show at least one example implementation and in which.

DETAILED DESCRIPTION

Figure 1:
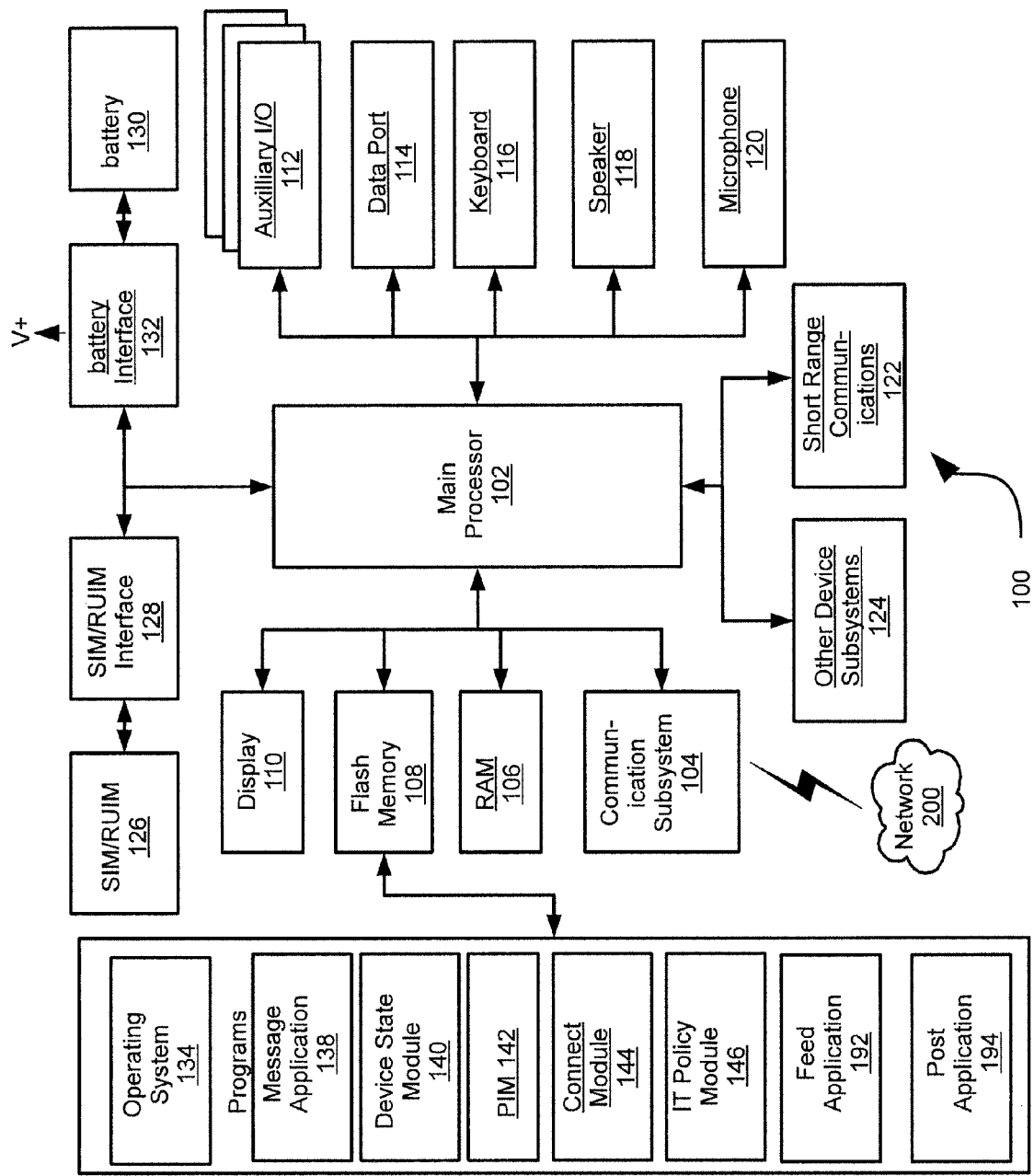
FIG. 1 is a block diagram of an example implementation of a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

A first aspect of the specification provides a method for posting data to a plurality of accounts at a plurality of remote servers via a mobile device comprising a processor interconnected with a display, an input device and a communication subsystem. The method can comprise: controlling the display to generate a message region for receiving message data to be posted to at least a subset of the plurality of accounts; controlling the display to generate icons, associated with the plurality of accounts, in a one-to-one relationship, the icons provided adjacent to the message region, each icon comprising: a first respective indicator of a respective account; a second respective indicator of a service associated with the account; and a respective picture; receiving input data from the input device indicating that at least one of the icons has been selected; controlling the display to provide an indicator of selection at each of the icons which are selected; and transmitting the message data to each of the plurality of accounts associated with each of the icons which are selected via the communication subsystem.

Each respective picture can comprise at least one of: a picture stored at the mobile device; a picture associated with a respective account of the plurality of respective accounts; or a picture downloaded from a remote server associated with the respective account. The method can further comprise refreshing the picture downloaded from the remote server by querying the remote server in a refresh operation and receiving a refresh picture in response. The method can further comprise refreshing the picture downloaded from the remote server by receiving a refresh picture from the remote server, the refresh picture transmitted by the remote server in a refresh operation.

The first respective indictor can comprise a textual indicator of a name of the respective account provided adjacent to the respective picture.

The second respective indicator can comprise the respective picture.

The second respective indicator can comprise a visual indicator inset in the respective picture.

The indicator of selection can comprise at least one of: a visual difference between selected icons and unselected icons; a visual indicator inset in the second respective picture; a border surrounding the respective picture; or the respective picture for selected icons provided with an original color scheme, wherein pictures for unselected icons are provided with a changed color scheme.

The method can further comprise receiving the message data in the message region via the input device.

The method can further comprise: receiving messages from at least a second subset of the accounts via the communication subsystem, each of the messages received in a respective data feed; controlling the display to provide the messages; receiving selection data from the input device indicating that one of the messages has been selected via the input device; and populating the message region with the one of the messages, such that the message data can comprise the one of the messages.

The method can further comprise: controlling the display to provide, adjacent to at least one of the message region or the icons, a region for receiving at least one of link data, picture data, file data, event data, or video data; and posting at least one of the link data, the picture data, the file data, the event data, or the video data for upload with the message data.

Each of the plurality of accounts can be associated with a respective maximum number of characters that can be uploaded to each account, the method can further comprise: receiving the data in the message region as textual characters; and, as each respective maximum number of characters is exceeded, changing selected icons associated with each respective maximum number from a selected state to an unselected state. The method can further comprise preventing unselected icons associated with an exceeded maximum number of characters from being selected.

Each of the plurality of servers can comprise at least one of a social networking server, an RSS (real simple syndication) server, or a news server.

A second aspect of the specification provides a mobile device for posting data to a plurality of accounts at a plurality of remote servers. The mobile device can comprise a processor interconnected with a display, an input device and a communication subsystem. The processor is enabled to: control the display to generate a message region for receiving message data to be posted to at least a subset of the plurality of accounts; control the display to generate icons, associated with the plurality of accounts, in a one-to-one relationship, the icons provided adjacent to the message region, each icon comprising: a first respective indicator of a respective account; a second respective indicator of a service associated with the account; and a respective picture; receive input data from the input device indicating that at least one of the icons has been selected; control the display to provide an indicator of selection at each of the icons which are selected; and transmit the message data to each of the plurality of accounts associated with each of the icons which are selected via the communication subsystem.

Each respective picture can comprise at least one of: a picture stored at the mobile device; a picture associated with a respective account of the plurality of respective accounts; or a picture downloaded from a remote server associated with the respective account. The processor can be further enabled to refresh the picture downloaded from the remote server by querying the remote server in a refresh operation and receiving a refresh picture in response. The processor can be further enabled to refresh the picture downloaded from the remote server by receiving a refresh picture from the remote server, the refresh picture transmitted by the remote server in a refresh operation.

The first respective indictor can comprise a textual indicator of a name of the respective account provided adjacent to the respective picture.

The second respective indicator can comprise the respective picture.

The second respective indicator can comprise a visual indicator inset in the respective picture.

The indicator of selection can comprise at least one of: a visual difference between selected icons and unselected icons; a visual indicator inset in the second respective picture; a border surrounding the respective picture; or the respective picture for selected icons provided with an original color scheme, wherein pictures for unselected icons are provided with a changed color scheme.

The processor can be further enabled to receive the message data in the message region via the input device.

The processor can be further enabled to: receive messages from at least a second subset of the accounts via the communication subsystem, each of the messages received in a respective data feed; control the display to provide the messages; receive selection data from the input device indicating that one of the messages has been selected via the input device; and populate the message region with the one of the messages, such that the message data can comprise the one of the messages.

The processor can be further enabled to: control the display to provide, adjacent to at least one of the message region or the icons, a region for receiving at least one of link data, picture data, file data, event data, or video data; and post at least one of the link data, the picture data, the file data, the event data, or the video data for upload with the message data.

Each of the plurality of accounts can be associated with a respective maximum number of characters that can be uploaded to each account, and wherein the processor can be further enabled to: receive the data in the message region as textual characters; and, as each respective maximum number of characters is exceeded, change selected icons associated with each respective maximum number from a selected state to an unselected state. The processor can be further enabled to prevent unselected icons associated with an exceeded maximum number of characters from being selected.

Each of the plurality of servers can comprise at least one of a social networking server, an RSS (real simple syndication) server, or a news server.

A third aspect of the specification provides a system for posting data to a plurality of accounts. The system comprises a plurality of remote servers, the plurality of accounts associated with the plurality of accounts; and a mobile device in communication with the plurality of servers. The mobile device is enabled to: control an associated display to generate a message region for receiving message data to be posted to at least a subset of the plurality of accounts; control the display to generate icons, associated with the plurality of accounts, in a one-to-one relationship, the icons provided adjacent to the message region, each icon comprising: a first respective indicator of a respective account; a second respective indicator of a service associated with the account; and a respective picture; receive input data from the input device indicating that at least one of the icons has been selected; control the display to provide an indicator of selection at each of the icons which are selected; and transmit the message data to each of the plurality of accounts associated with each of the icons which are selected via an associated communication subsystem.

A fourth aspect of the specification provides a computer program product, comprising a computer usable medium having a computer readable program code adapted to be executed to implement a method for posting data to a plurality of accounts at a plurality of remote servers via a mobile device comprising a processor interconnected with a display, an input device and a communication subsystem, comprising: controlling the display to generate a message region for receiving message data to be posted to at least a subset of the plurality of accounts; controlling the display to generate icons, associated with the plurality of accounts, in a one-to-one relationship, the icons provided adjacent to the message region, each icon comprising: a first respective indicator of a respective account; a second respective indicator of a service associated with the account; and a respective picture; receiving input data from the input device indicating that at least one of the icons has been selected; controlling the display to provide an indicator of selection at each of the icons which are selected; and transmitting the message data to each of the plurality of accounts associated with each of the icons which are selected via the communication subsystem.

The implementations described herein generally relate to a mobile wireless communication device, hereafter referred to as a mobile device, which can be configured according to an Information Technology (IT) policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smartphones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of an example implementation of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the implementations described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106 (which can be generally viewed as any type of volatile storage), a flash memory 108 (which can be generally viewed as any type of non-volatile storage), a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. In certain implementations, to identify a subscriber, the mobile device 100 utilizes a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, identification information can also be programmed into the flash memory 108.

The mobile device 100 is a battery-powered device and includes a battery interface 132 for receiving one or more rechargeable batteries 130. In at least some implementations, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows mobile device 100 to send and receive electronic messages. Various alternatives exist for the message application 138 as is well known to those skilled in the art. Messages that have been sent or received are typically stored in the flash memory 108 of the mobile device 100 or some other suitable storage element in the mobile device 100. In at least some implementations, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some implementations, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

Figure 3:
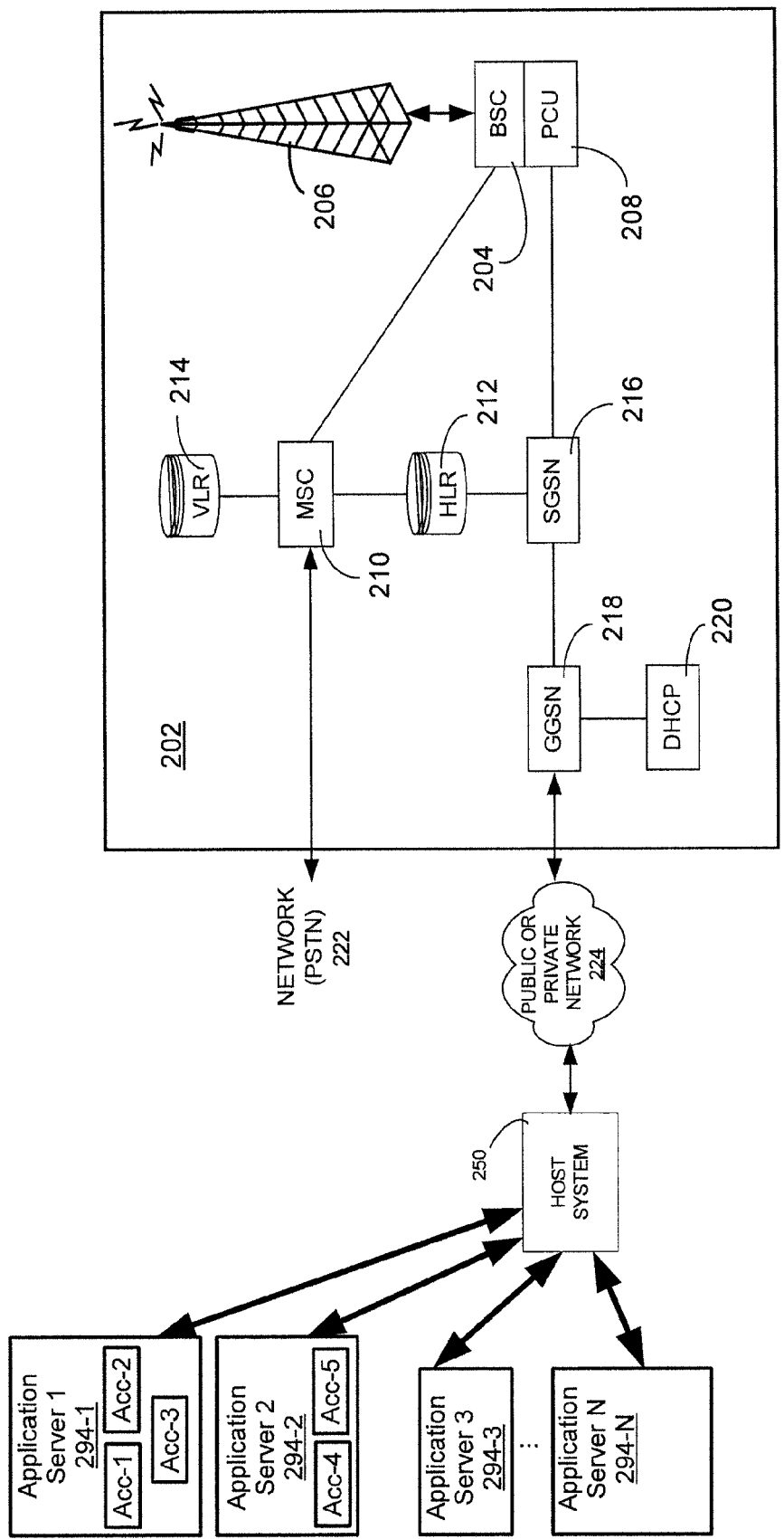
FIG. 3 is an example block diagram of a node of a wireless network.

In non-limiting implementations, mobile device 100 can include a feed application 192 and a post application 194. Feed application 192 receives data from any suitable number of application servers 294-1, 294-2, 294-3 . . . 294-N (collectively referred as application servers 294, and an individual application server as application server 294), which can comprise RSS (Really Simple Syndication) feed servers, social networking sites such as Twitter™, Facebook™, online communities, or the like. With reference to FIG. 3, data received from the application servers 294, via host system 250 described below, is provided in the feed application 192, for example in as associated graphical user interface (GUI) at display 110. Associated accounts ACC-1, ACC-2, ACC-3, ACC-4, ACC-5 application servers 194 are registered at mobile device 100 (e.g. registration data is stored in a data file associated with feed application 192), and when feed application 192 is running, feed application 192 logs into the associated accounts ACC-1, ACC-2, ACC-3, ACC-4, ACC-5 in an always connected mode. Hence, posts, news, feeds or the like from each account at each application server 294 appear in the GUI of the feeds application 192.

The post application 194, which is described in more detail below, has access to the stored registration data associated with the feeds application 192, and enables the mobile device 100 to upload data to at least a subset of application servers 194 simultaneously.

The post application 194, which is described in more detail below, has access to the stored registration data associated with the feeds application 192, and enables the mobile device 100 to upload data to at least a subset of applications servers 194 simultaneously.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem. A subscriber may also compose data items, such as e-mail messages, for example, using the keyboard 116 in conjunction with the display 110 and possibly the auxiliary I/O subsystem 112. The auxiliary subsystem 112 may include any suitable input device such as: a touch screen, mouse, track ball, infrared fingerprint detector, a touchpad, a touch screen or a roller wheel with dynamic button pressing capability. The keyboard 116 may comprise an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
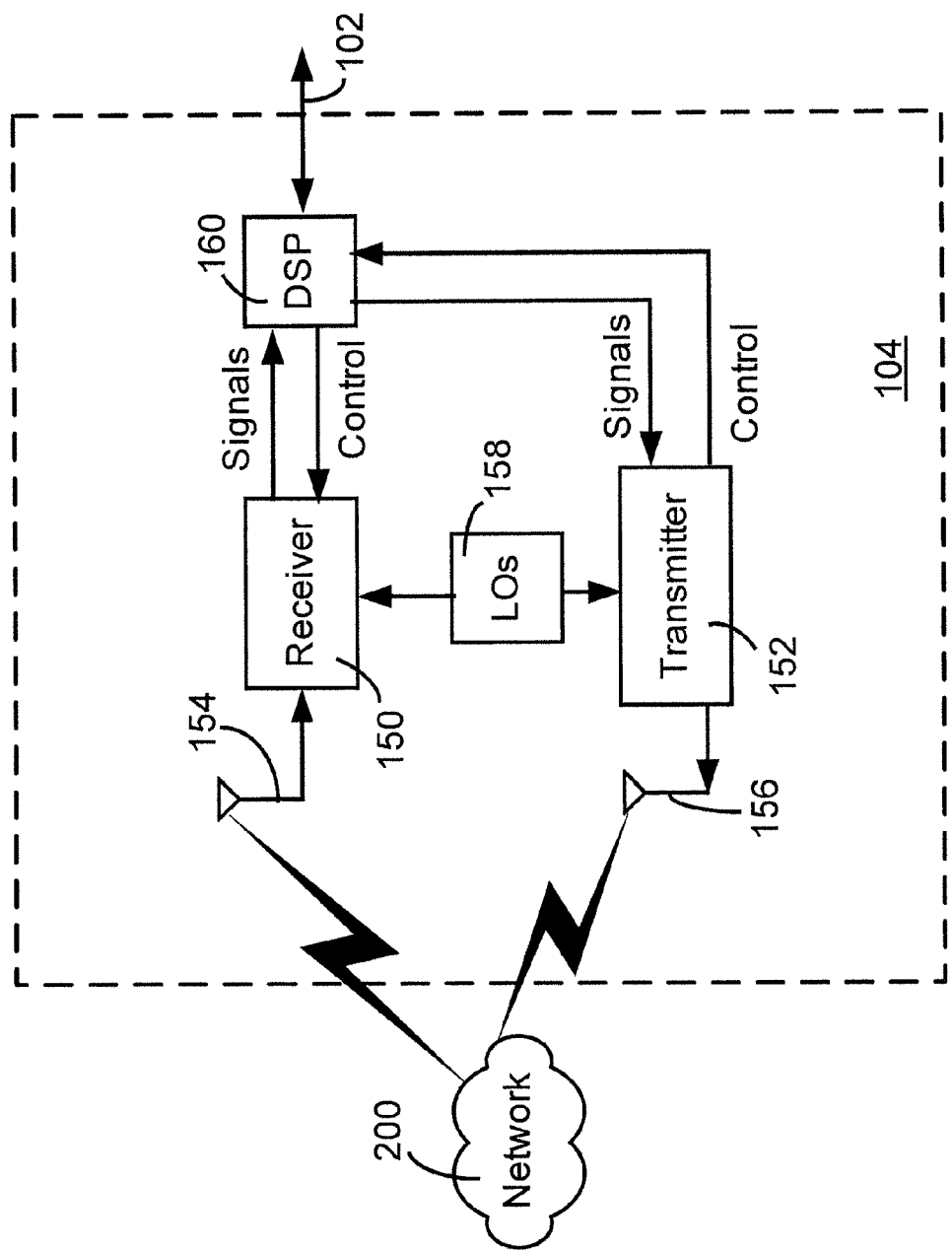
FIG. 2 is a block diagram of an example implementation of a communication subsystem component of the mobile device of FIG. 1.

Referring now to FIG. 2, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Referring now to FIG. 3, a block diagram of an example implementation of a node 202 of the wireless network 200 is shown. In practice, the wireless network 200 comprises one or more nodes 202. In conjunction with the connect module 144, the mobile device 100 can communicate with the node 202 within the wireless network 200. In the example implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides inter-networking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels such as Integrated Services Digital Network (ISDN) where addresses are used for routing incoming and outgoing calls. Currently, all GPRS capable networks use private, dynamically assigned IP addresses, thus requiring the DHCP server 220 connected to the GGSN 218. There are many mechanisms for dynamic IP address assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Furthermore, the host system 250 is in communication with the application servers 294 via any suitable combination of communication links and communication networks, which can be at least one of wired or wireless. As described above, the mobile device 100 can be signed into accounts ACC 1, ACC-2, ACC-3, ACC-4, ACC-5 at the application servers 294, and the application servers 294 can send data associated with the respective accounts to the mobile device 100 for storage and display thereon, for example via the feed application 192. Furthermore, data can be posted to application servers 294 via post application 194 described below. Applications servers 194 can comprise RSS (Really Simple Syndication) feed servers, social networking sites such as Twitter™, Facebook™, or the like, or any other suitable application server.

Furthermore, mobile device 100 is associated with at least one account ACC-1, ACC-2, ACC-3, ACC-4, ACC-5 at, at least one application server 294 (accounts ACC-1, ACC-2, ACC-3, ACC-4, ACC-5 collectively referred as accounts ACC, and generically as an account ACC). Each application server 194 can be associated with one or more of accounts ACC. As depicted application server 294-1 is associated with accounts ACC-1, ACC-2, ACC-3, application server 294-2 is associated with accounts ACC-4, ACC-5, and application servers 294-3, 294-N are not associated with any accounts.

Indeed, it is appreciated that application servers 294-1, 294-2 are each enabled to provide services for which multiple accounts for mobile device 100 have been created, specifically services that provide data to mobile device 100 for feed application 192, such as social networking data, RSS data, feed data, or the like. Furthermore, data can be posted or published to accounts ACC-1, ACC-2, ACC-3, ACC-4, ACC-5 for access by other devices who are subscribed to respective data from accounts ACC. It is further appreciated that application servers 294-3, 294-N are application servers for which no accounts have yet been created; however accounts could be created at a later time.

Figure 4:
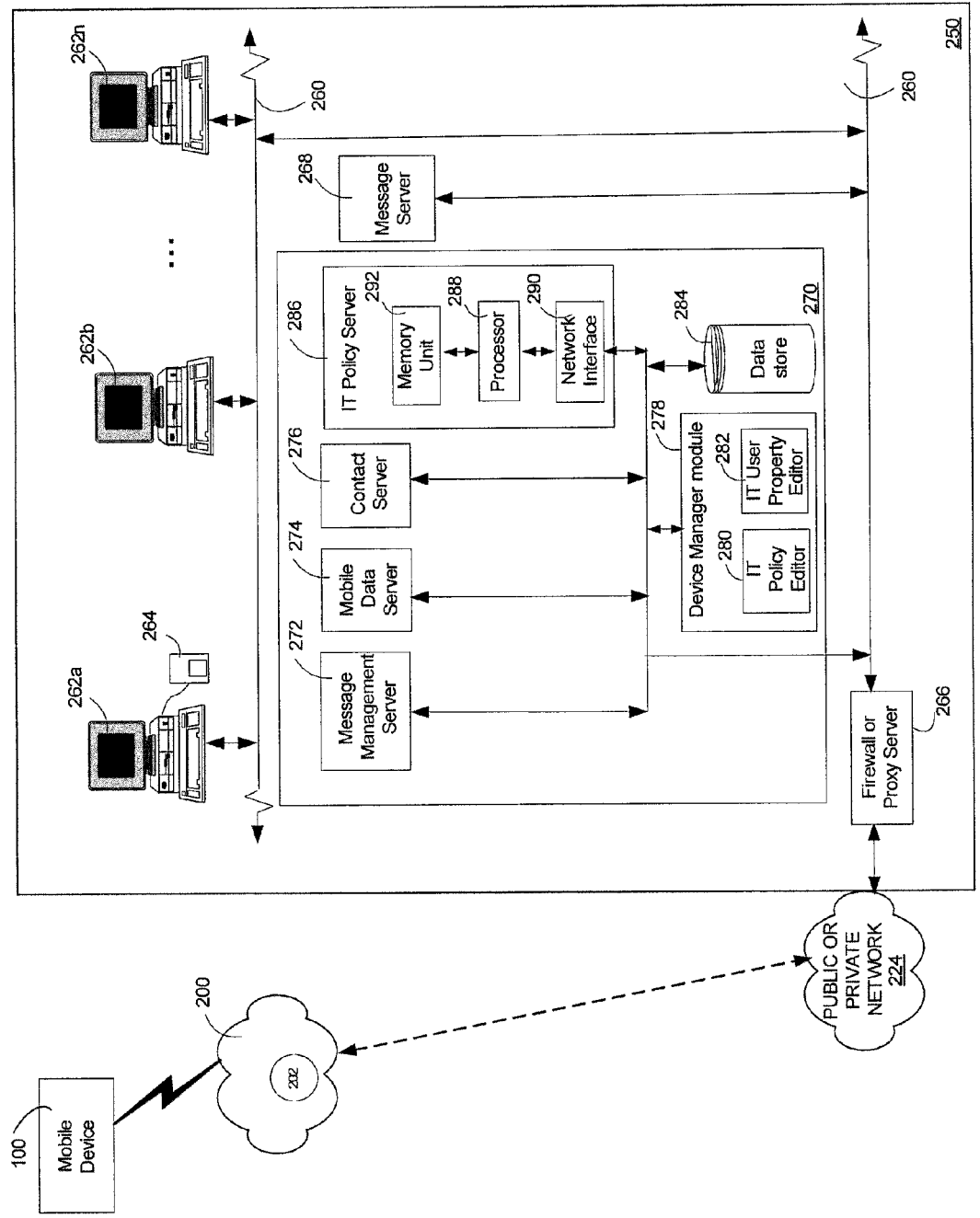
FIG. 4 is a block diagram illustrating components of a host system in one example configuration for use with the wireless network of FIG. 3 and the mobile device of FIG. 1, the host system in communication with application servers.

Referring now to FIG. 4, shown therein is a block diagram illustrating components of an example configuration of a host system 250 that the mobile device 100 can communicate with in conjunction with the connect module 144. While not depicted in FIG. 4, it is appreciated that host system 250 is also in communication with application server 294. The host system 250 will typically be a corporate enterprise network or other local area network (LAN), but may also be a home office computer or some other private system, for example, in variant implementations. In this example shown in FIG. 4, the host system 250 is depicted as a LAN of an organization to which the mobile device 100 is associated. Typically, a plurality of mobile devices can communicate wirelessly with the host system 250 through one or more nodes 202 of the wireless network 200.

The host system 250 comprises a number of network components connected to each other by a network 260. For instance, a desktop computer 262a with an accompanying cradle 264 for the mobile device 100 is situated on a LAN connection. The cradle 264 for the mobile device 100 can be coupled to the computer 262a by a serial or a Universal Serial Bus (USB) connection, for example. Other computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this example configuration. More generally, the host system 250 may represent a smaller part of a larger network (not shown) of the organization, and may comprise different components and/or be arranged in different topologies than that shown in the example implementation of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative implementation, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example implementation, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268.

Some example implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some implementations, the data store may be a separate hardware unit, such as data store 284, that the message server 268 communicates with. Messages can be subsequently retrieved and delivered to users by accessing the message server 268. For instance, an e-mail client application operating on a user's computer 262*a* may request the e-mail messages associated with that user's account stored on the data store associated with the message server 268. These messages are then retrieved from the data store and stored locally on the computer 262*a*. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile devices need to be supported.

Alternatively, in some implementations, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis as explained further below and in conjunction with FIGS. 5 to 8. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

It is to be emphasized that the foregoing provides non-limiting examples of configurations for mobile device 100, host system 250. For example, it is to be understood that mobile device 100 is purely an example, and it will be apparent to those skilled in the art that a variety of different portable electronic device structures are contemplated. Indeed variations on mobile device 100 can include, without limitation, a cellular telephone, a portable email paging device, a camera, a portable music player, a portable video player, a portable video game player and the like. Other contemplated variations include devices which are not necessarily portable, such as desktop computers.

Figure 5:
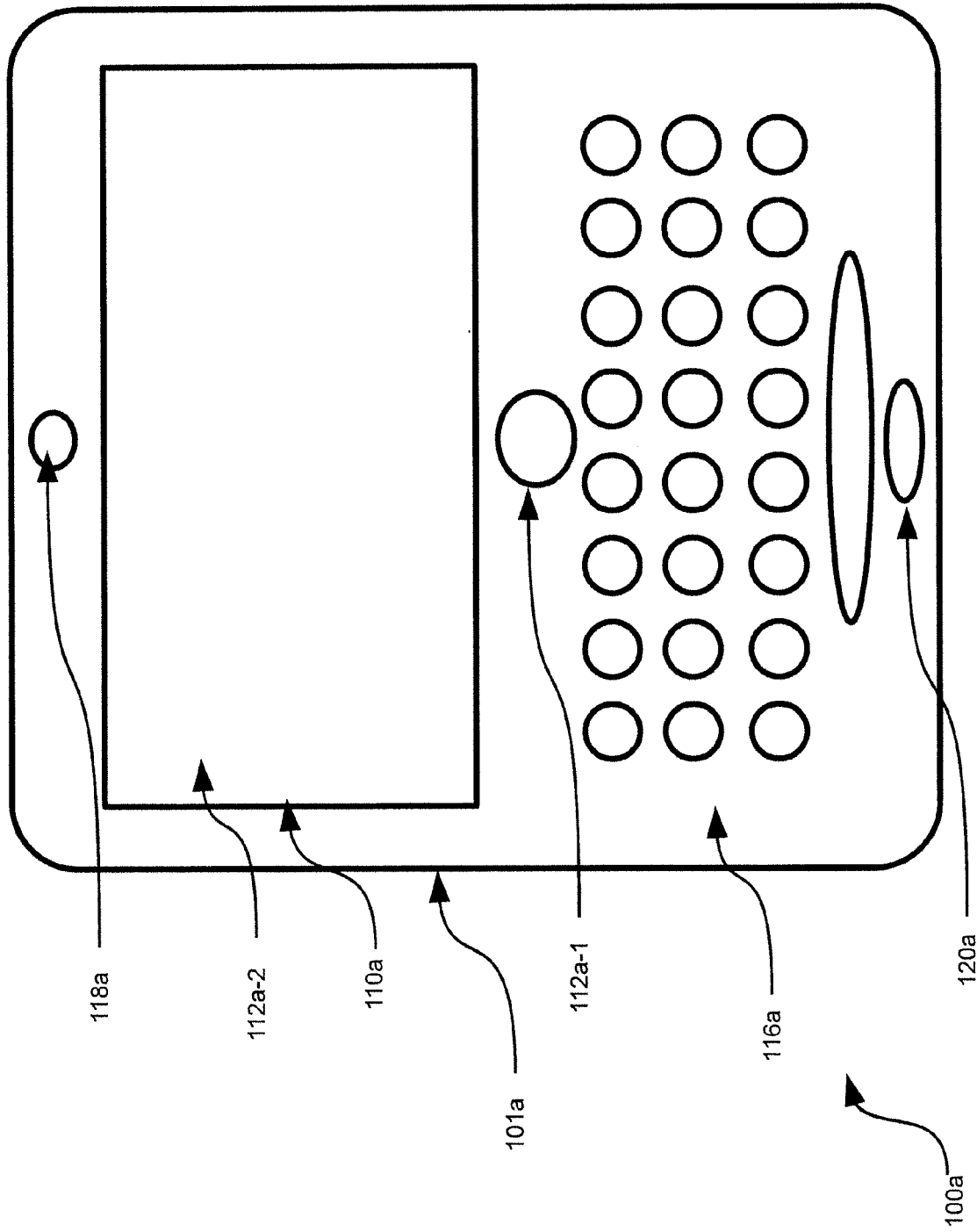
FIG. 5 is a schematic representation of an appearance of a mobile device according to FIG. 1.

Referring now to FIG. 5, a specific contemplated variation of device 100 is indicated at 100a. Mobile device 100a contains several of the same components as device 100, or variations on them, and accordingly, like components bear like references, except followed by the suffix "a". However, while FIG. 1 showed a block diagram of the internal components of device 100, FIG. 5 shows an example physical appearance and structure for device 100a. Of note is that FIG. 5 shows the mobile device 100a as comprising a chassis 101a that supports display 110a. Display 110a can comprise one or more light emitters such as an array of light emitting diodes (LED), liquid crystals, plasma cells, or organic light emitting diodes (OLED). Other types of light emitters are contemplated. Chassis 101a also supports keyboard 116a. It is to be understood that this specification is not limited to any particular structure, spacing, pitch or shape of keyboard 116a, and the depiction in FIG. 5 is purely example. For example, full or reduced "QWERTY" keyboards are contemplated. Other types of keyboards are contemplated. Device 100a also comprises a first pointing device 112a-1 which in a present implementation is implemented as a touch-pad, but in other implementations can be implemented as a joystick, trackball, trackwheel. Device 100a also comprises a second pointing device 112a-2 which in a present implementation is implemented as a touch-sensitive membrane disposed over display 110a, thereby providing a touch-screen for device 100a. While two pointing devices 112a-1 and 112a-2, it is to be understood that in variations, only one pointing device 112a-1 and 112a-2 may be provided. It should also be understood that other types of input devices are contemplated, including input devices which are structurally different that the specific examples provided are contemplated, but are also functionally equivalent and able to, for example, receive "swipe" inputs and send an electrical signal representing such an input to processor 102b. Device 100a also comprises a speaker 118a for generating audio output, and a microphone 120a for receiving audio input.

Figure 6:
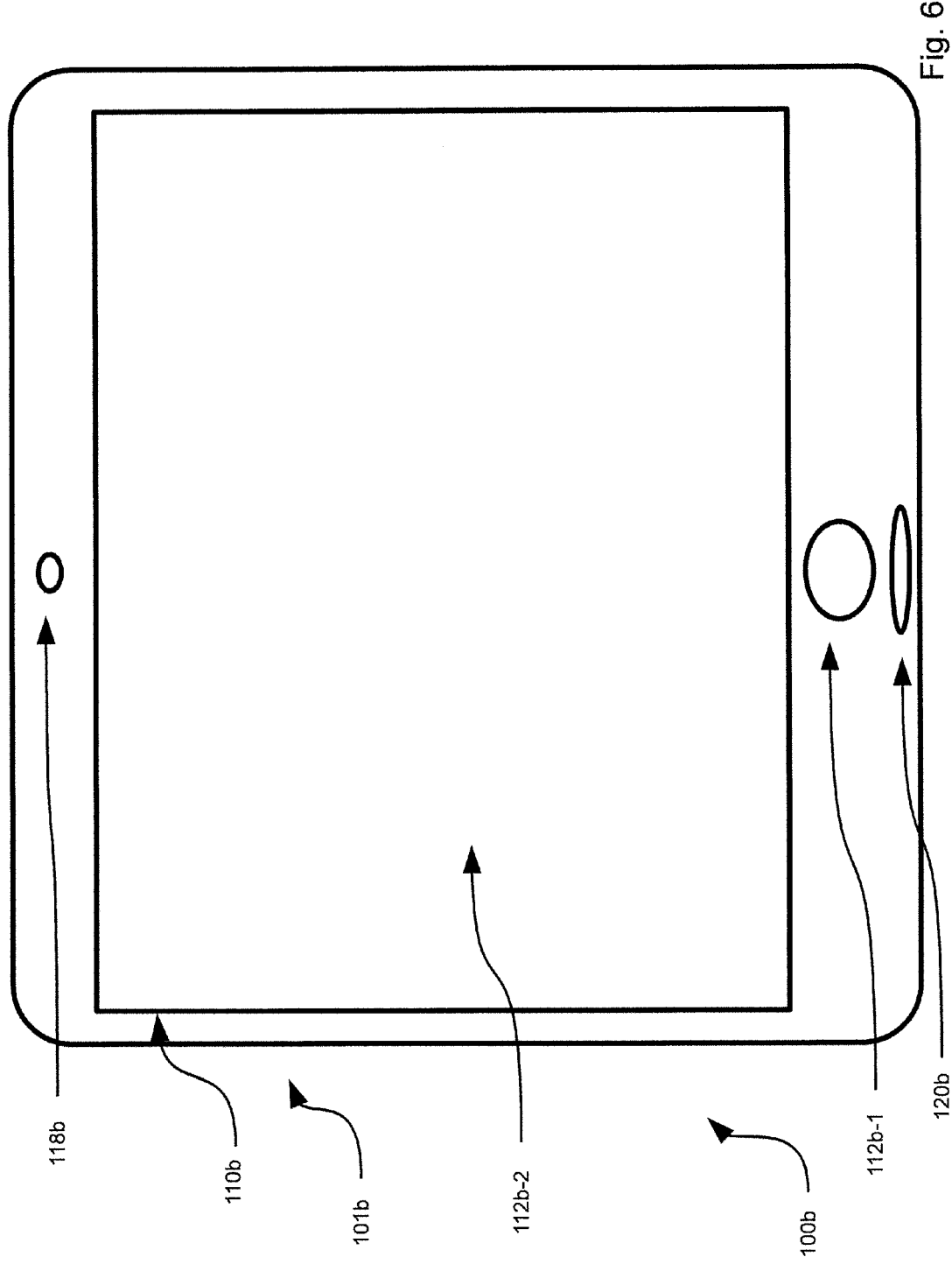
FIG. 6 is a schematic representation of an appearance of another mobile device.

Referring now to FIG. 6, another specific contemplated variation of device 100 is indicated at 100b. Mobile device 100b contains several of the same components as device 100a, or variations on them, and accordingly, like components bear like references, except followed by the suffix "b". Of note is that in FIG. 6, keyboard 116a is not provided, while two pointing devices 112b-1 and 112b-2 are provided. Again, in a variation of device 100b, only one of pointing devices 112a-1 and 112a-2 may be provided, although in such a variation, typically second pointing device 112b-2 is provided in order to provide a touch-screen for device 100b.

Figure 7:
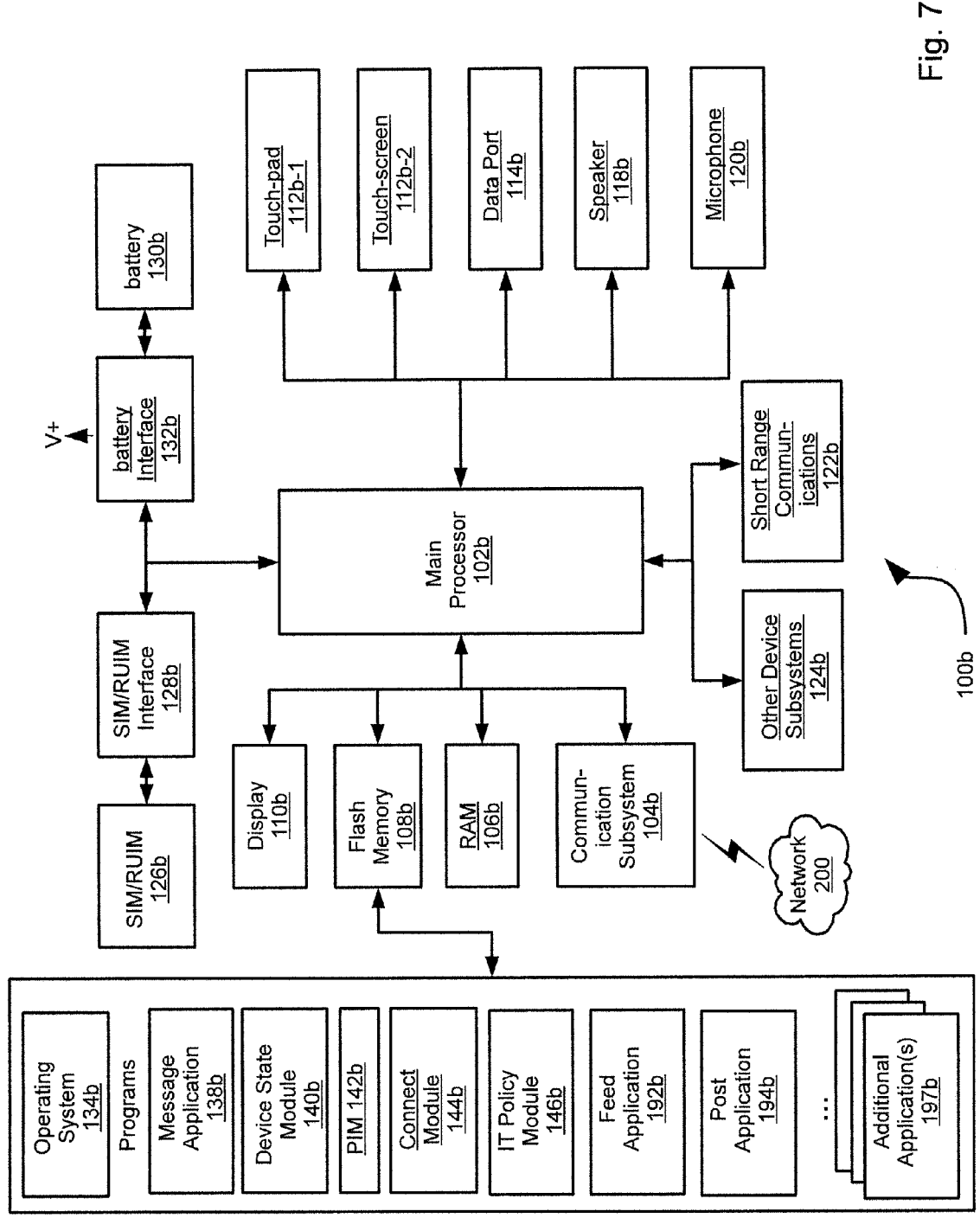
FIG. 7 is a block diagram of the mobile device of FIG. 6.

For convenience, the following discussion is made with reference to mobile device 100b, including both pointing devices 112b-1 and 112b-2, but upon reading the remainder of this specification, those skilled in the art will become able to appreciate how the following discussions can be applied to variations of mobile device 100b. To that end, FIG. 7 shows a block diagram of device 100b. FIG. 7 is a modified version of FIG. 1, and of note FIG. 7 specifically shows touch-pad 112b-1 and touch-screen 112b-2. Also of note is that, in a present non-limiting example implementation, touch-pad 112b-1 is configured to not only be sensitive to touch inputs, but touch-pad 112b-1 is also mechanically structured as a mechanical switch, such that it can also be mechanically depressed and moved in a direction that is normal to the surface of touch-pad 112b-1. The mechanical switch is also spring biased towards a non-depressed position, so that upon release the mechanical switch returns to the non-depressed position. Accordingly, touch-pad 112b-1 is configured to receive selection inputs by mechanical depression of touch-pad 112b-1, while touch-screen 112b-2 is configured to receive selection inputs corresponding to screen focus by a tap received on touch-screen 112b-2. It should be noted, however, that in variations, touch-pad 112b-1 can additionally be configured, or alternatively configured, to receive selection inputs by a tap received on touch-pad 112b-1. Where touch-pad 112b-1 can received a tap input, then the mechanical switch can be removed from touch-pad 112b-1 altogether.

While not shown, in another variation it should be understood that touch-screen 112b-2 can also be varied to also include a mechanical switch so that a force requiring a mechanical click on touch-screen 112b-2 in order to select an item in focus on touch screen 112b-2. Such a mechanical switch can be provided for touch-screen 112b-2 either in lieu of, or in addition to, the "tap" input capability provided for touch-screen 112b-2.

FIG. 7 also specifically shows, as part of device 100b, at least one additional application 197b.

Figure 8:
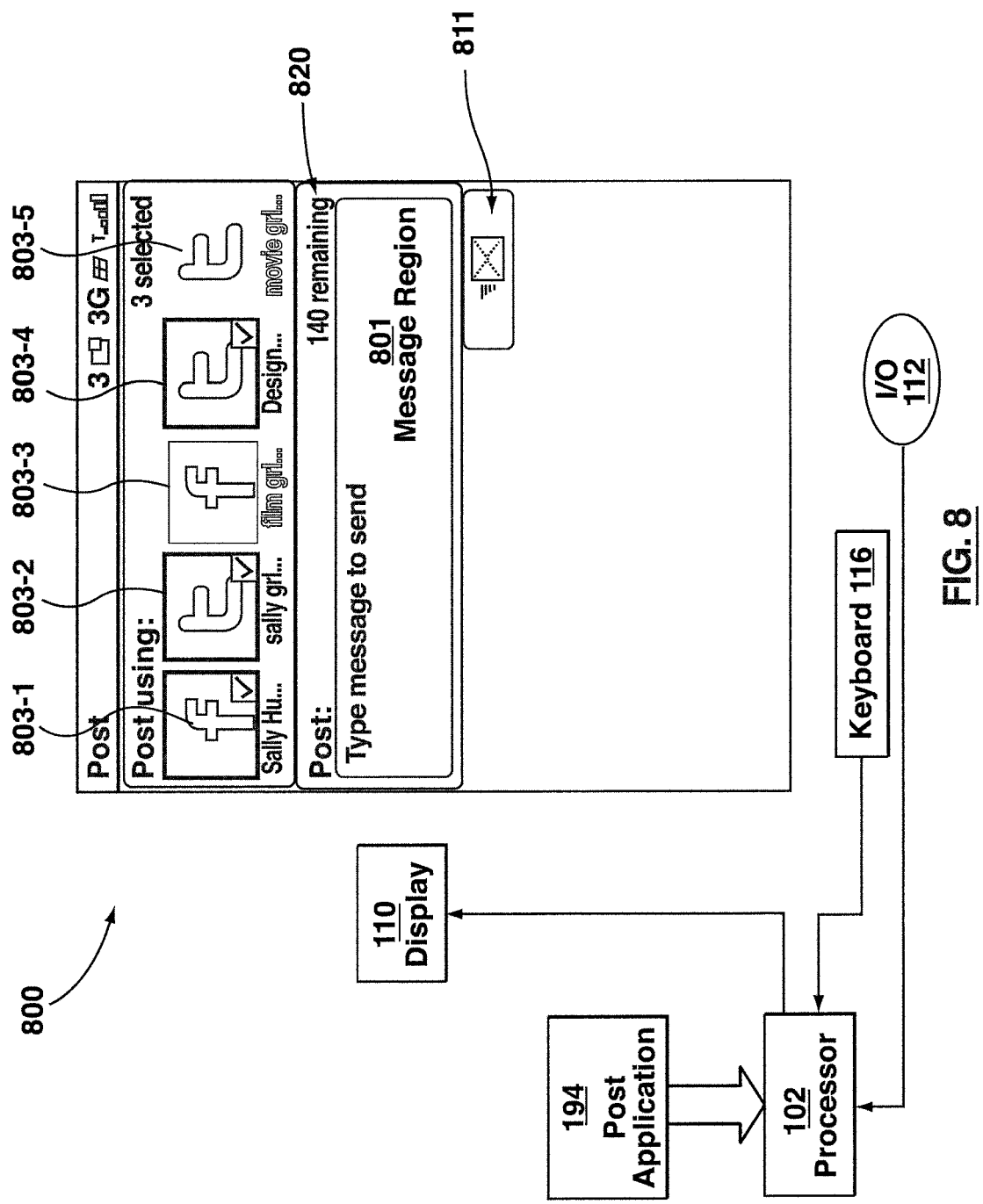
FIG. 8 is an example of a screen generated on the display of the mobile device of FIG. 1 showing a post application.

FIG. 8 shows a non-limiting example of execution of post application 194 on processor 102. Alternatively post application 194a can be executed on processor 102b. In any event, when post application 194 is executed at processor 102, processor 102 controls display 110 to provide representation 800. As can be seen in FIG. 8, processor 102 controls display 110 to provide a message region 801 in representation 800, icons 803-1, 803-2, 803-3, 803-4 (collectively icons 803 and individually an icon 803) adjacent to message region 801.

Message region 801 is for receiving message data (e.g. text received in message region 801) to be posted to at least a subset of the plurality of accounts ACC at application servers 294. For example, message data can be received in message region 801 via keyboard 116. Alternatively, message data can be received via feed application 192, as will be described below.

Icons 803 are provided for each of the plurality of accounts ACC-1, ACC-2, ACC-3, ACC-4, ACC-5 in a one-to-one relationship. Each icon 803 can be selected via auxiliary I/O 112, for example by receiving input data from auxiliary I/O 112 indicating that at least one of the icons 803 has been selected.

When an icon 803 is selected, message data in message region 801 is posted to each account ACC associated with a selected icon 803.

Representation 800 further comprises a non-limiting remaining characters region 820, which is updated with each character of text received in message region 801. For example, uploads to some accounts ACC (e.g. Twitter™ accounts) can be limited to a total given maximum number of characters, such as 140 characters. However, different accounts can have different maximum numbers of characters that can be uploaded. The maximum total number of characters that can be provided in message region 801 can be determined from the account ACC having smallest maximum number of characters that can be uploaded (e.g. a lowest common denominator character limit, so that message data can be posted to all accounts ACC). As depicted in FIG. 8, region 820 indicates that 140 characters are remaining as no text has yet been received in message region 801. In contrast, in FIG. 16 described below, 13 characters have been received in message region 801, and hence region 820 has been updated, by processor 102 controlling display 110, to indicate that 127 characters are remaining.

Figure 9:
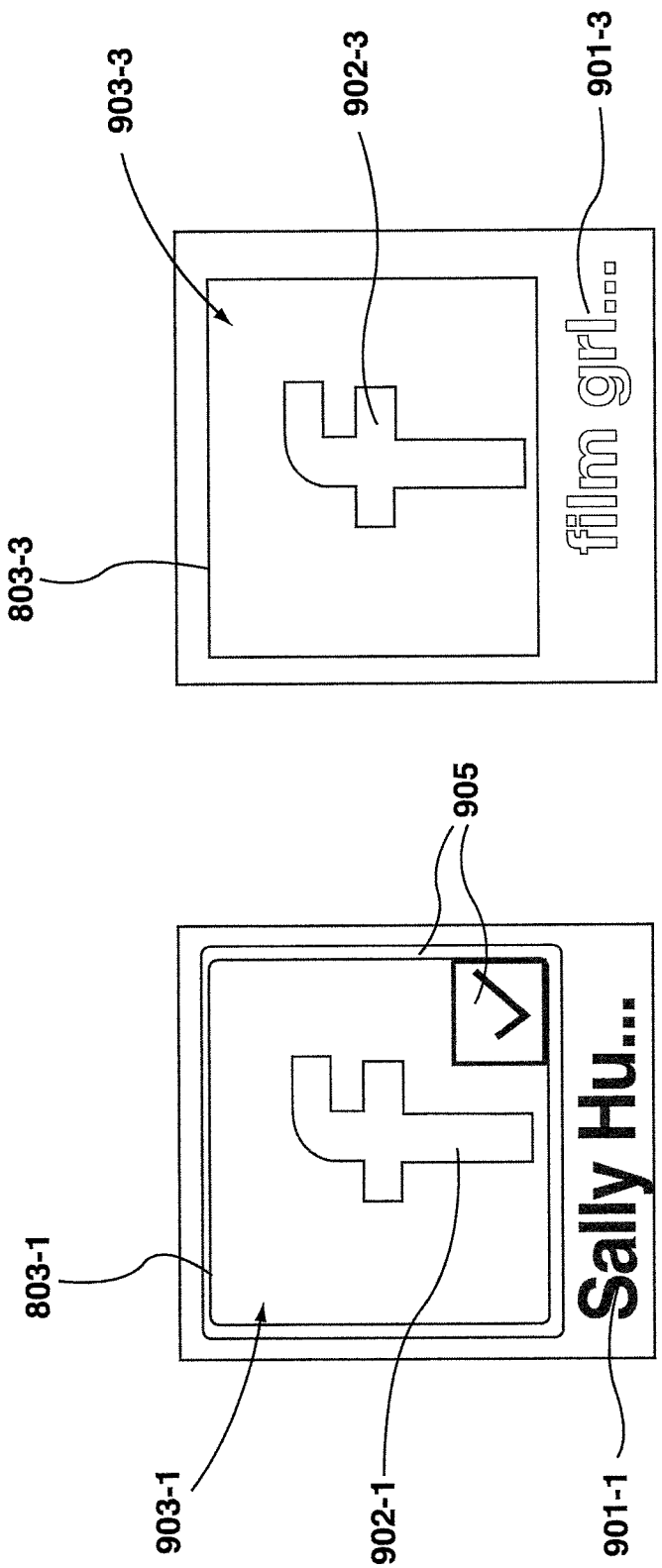
FIG. 9 is an example of icons of FIG. 8 with components thereof labeled.

FIG. 9 depicts icons 803-1 and 803-2 in more detail, icon 803-1 being a selected icon and icon 803-2 being an unselected icon. Each icon 803, as represented by icons 803-1, 803-3, respectively comprises a first respective indicator 901-1, 901-3 of a respective account, a second respective indicator 902-1, 902-3 of a service associated with a respective account ACC, and a respective picture 903-1, 903-3.

Each first indicator 901-1, 901-3 can comprise a textual indicator of a name of a respective account ACC, for example a first portion of the name "Sally Hume" and "filmgrl". Where the name of an account ACC is too long to be fully provided in an icon 803, the name can be partially shown as in "Sally Hu . . . ". Furthermore, it is appreciated that while each icon 803-1, 803-3 is associated with the same service/application server 294, as will be described below, each icon 803-1, 803-3 is associated with different accounts ACC: for example the account "Sally Hume" could be used to receive and post data related to personal friends and associates of Sally Hume, while the account "filmgrl" could be used to receive and post data related to film, cinema etc. using the same service.

Each second indicator 902-1, 902-3 can comprise a textual or visual indicator of a service associated with a respective account ACC. For example, in depicted implementations, each second indicator 902-1, 902-3 comprises a stylized lower-case "f", indicating that the associated service is Facebook™.

Each picture 903-1, 903-2 comprises a picture associated with the respective account ACC. In implementations depicted in FIG. 9, each picture 903-1, 903-2 includes the respective indicator 902-1, 902-3; however, in other implementations, each picture 903-1, 903-2 can include at least one of a picture stored at said mobile device, a picture associated with a respective account, or a picture downloaded from a respective application server 294 associated with a respective account ACC. For example, each account ACC can be associated with a profile picture stored at a respective application server 294; respective profile pictures can be downloaded to mobile device 100 and provided as respective pictures 903-1, 903-3, as will be described below with reference to FIG. 12.

In any event, first indicator 901-1, 903-3 can be provided adjacent to respective pictures 902-1, 902-3.

Furthermore, when an icon 803 is selected, for example via auxiliary I/O 112, processor 102 can control display 110 to provide an indicator 905 of selection at each of the icons 803 which are selected, for example icon 803-1. In implementations depicted in FIG. 9, indicator 905 comprises a visual indicator, specifically a checkmark, inset in picture 902-1 and border surrounding picture 902-1. In general, selection of an icon 803 is further indicated by a visual difference between selected icons, such as 803-1, 803-2, 803-4 and unselected icons, such as icons 803-3, 803-5. For example, in selected icon 803-1, picture 902-1 is provided with an original color scheme, whereas in unselected icon 803-3, picture 902-3 is provided with a changed color scheme. Specifically, picture 902-3 is greyed out, which can also be referred to as "ghosted". Alternatively, an unselected icon 803 can be disabled.

Once a subset of icons 803 have been selected and message data has been received in message region 801, mobile device 100 transmits the message data to each of the plurality of accounts ACC (at their respective servers 294) associated with each of the icons 803 which are selected, for example via the communications subsystem 104. Posting can occur once input data is received via auxiliary input I/O that a virtual button 811 has been actuated. It is appreciated that mobile device 100 can store addresses of application servers 294 or that host system 250 can store the addressed of application servers 294, the message data sent to application servers 294 via the host system 250.

Figure 10:
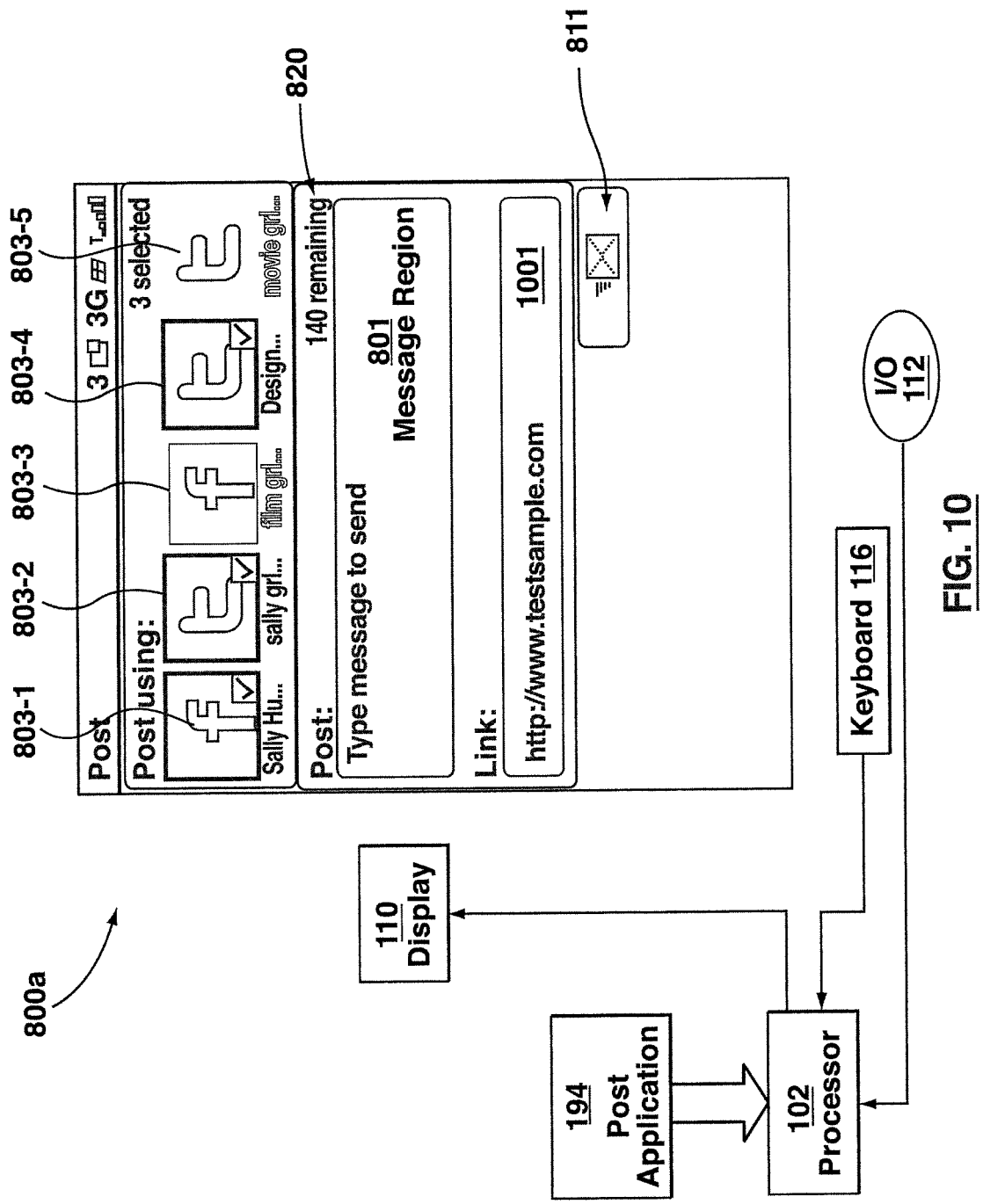
FIG. 10 shows a variation of the screen of FIG. 8.

Attention is now directed to FIG. 10, which is substantially similar to FIG. 8, with like elements having like numbers, however representation 800 has been replaced by representation 800a. Representation 800a is similar to representation 800 with like elements having like numbers, however representation 800a includes a link region 1001 for receiving at least one set of link data to be posted with message data. In depicted implementations, link region 1001 is provided adjacent to message regions 801, however in other implementations, link region 1001 can be provided adjacent to icons 803 (e.g. in between message region 801 and icons 803, or any other suitable region). In general a link provided in link region 1001 can be any suitable link, including but not limited to a URL (universal resource locator). In any event, when virtual button 811 is actuated message data in message region 801 and a link in link region 1001 are posted to each of the plurality of accounts ACC (at their respective servers 294) associated with each of the icons 803 which are selected, for example via the communications subsystem 104.

Figure 11:
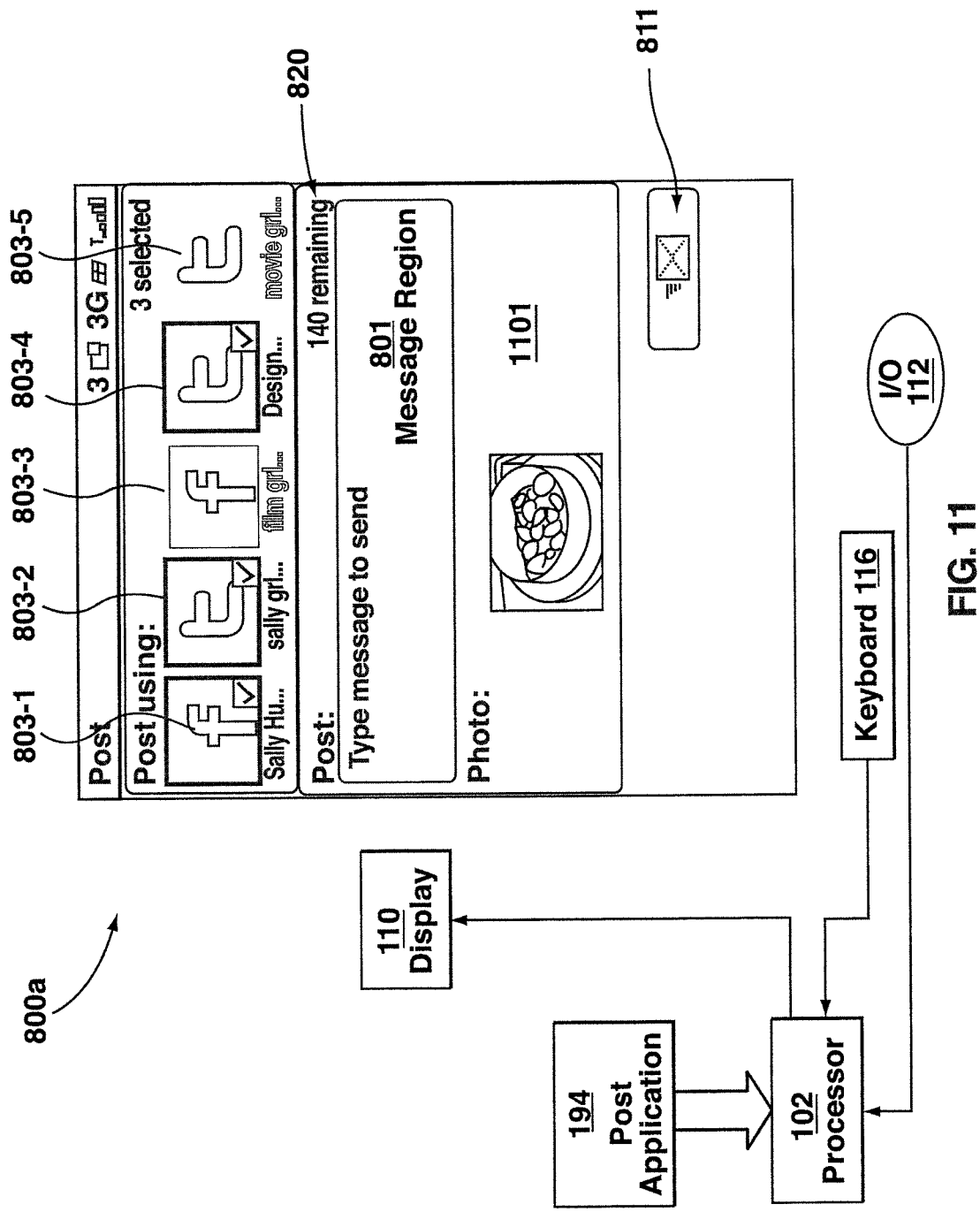
FIG. 11 shows a variation of the screen of FIG. 8.

Attention is now directed to FIG. 11, which is substantially similar to FIG. 8, with like elements having like numbers, however representation 800 has been replaced by representation 800b. Representation 800b is similar to representation 800 with like elements having like numbers, however representation 800b includes a picture region 1101 for receiving a picture for upload to be posted with message data. In depicted implementations, picture region 1101 is provided adjacent to message regions 801, however in other implementations, picture region 1101 can be provided adjacent to icons 803 (e.g. in between message region 801 and icons 803, or any other suitable region). In general a picture provided in picture region 1101 can comprise any suitable picture file, and can be represented by a representation of the picture (as depicted), a file name or the like. In any event, when virtual button 811 is actuated, message data in message region 801 and a picture in picture region 1101 are posted to each of the plurality of accounts ACC (at their respective servers 294) associated with each of the icons 803 which are selected, for example via the communications subsystem 104.

In yet further implementations one or more additional regions can be provided for receiving file data, event data or video data such that at least one of the file data, the event data, or the video data can be posted for upload with the message data.

Figure 12:
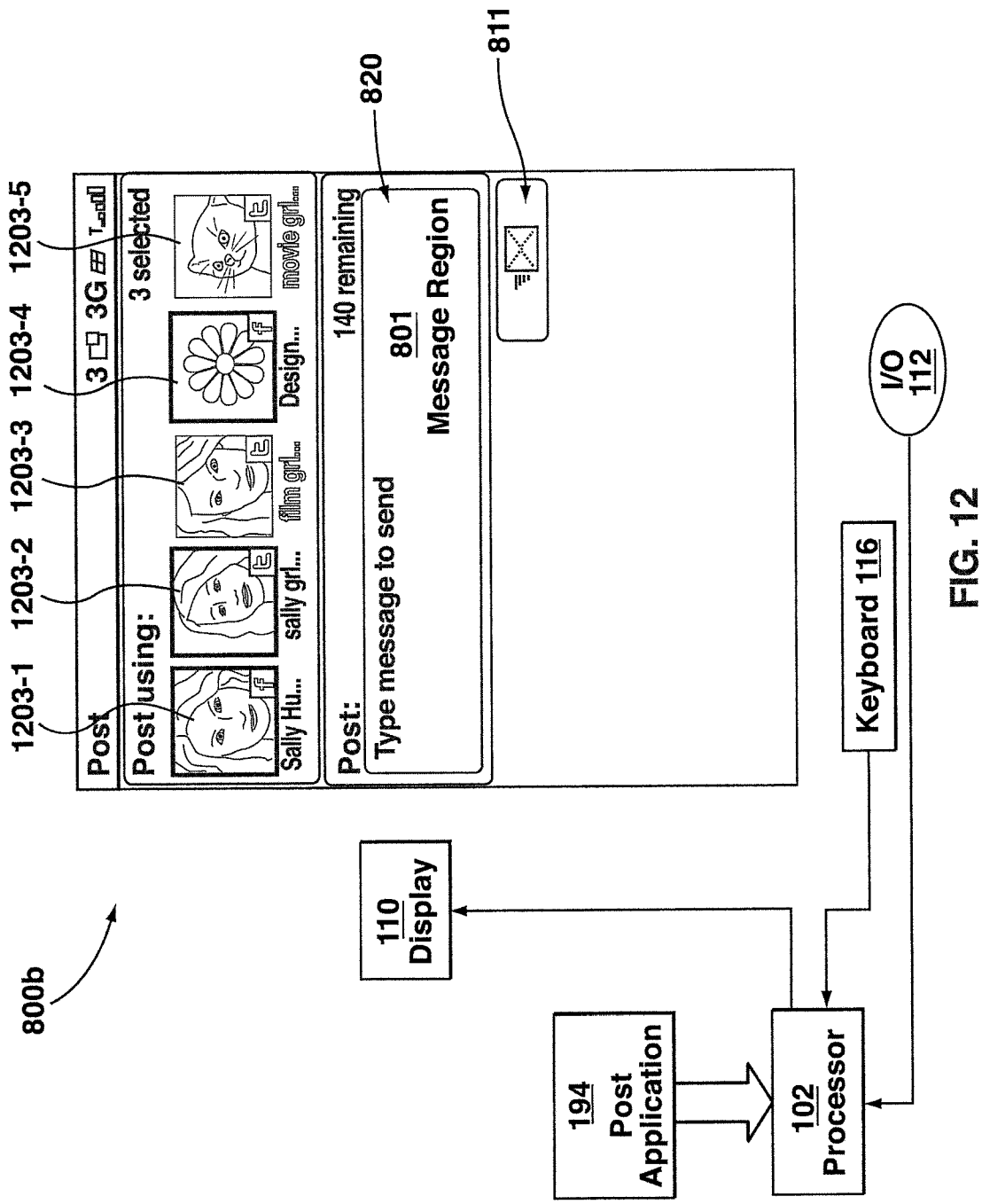
FIG. 12 shows a variation of the screen of FIG. 8.

Attention is now directed to FIG. 12, which is substantially similar to FIG. 8, with like elements having like numbers, however representation 800 has been replaced by representation 800b. Representation 800b is similar to representation 800 with like elements having like numbers, however representation 800b includes icons 1203-1, 1203-2, 1203-3, 1203-4 (collectively icons 1203 and individually an icon 1203), each respectively corresponding to icons 803-1, 803-2, 803-3, 803-4. However in icons 1203, pictures have been replaced with profile pictures downloaded from respective application servers 924 (e.g. pictures 903-1, 903-3 have been replaced with profile pictures). For example, profile pictures can be uploaded to the respective application server 924 for each account ACC. The profile pictures can be uploaded from mobile device 100 or any other suitable computing device used to access accounts ACC. It is appreciated that such profile pictures are generally used to identify posts, messages, etc. associated with account ACC: for example, when the posts, messages etc., are accessed by other accounts (e.g. in a news feed, a live feed, an RSS feed or the like), the posts, messages etc. are supplied with the accompanying profile picture such that they can be identified as having originated at a respective account ACC.

Furthermore, it is appreciated that the profile pictures can be updated at each account ACC at each respective application server 294.

In any event, in these implementations, mobile device 100 is enabled to incorporate profile pictures into icons 1203 by either requesting the profile pictures associated with each account ACC, from each respective server 294, or by application server 294 pushing profile pictures associated with accounts ACC, which are in turn associated with mobile device 100, to mobile device 100. In either implementation, the profile pictures can be provided to mobile device 100 in at least one of a synchronization event or a refresh event. Incorporation of profile pictures into icons 1203 more readily identifies or distinguishes the various accounts ACC. Hence, incorporation of profile pictures into icons 1203 can avoid inadvertent posting of data (e.g. message data, links, pictures, videos or the like) to unintended accounts ACC.

Figure 13:
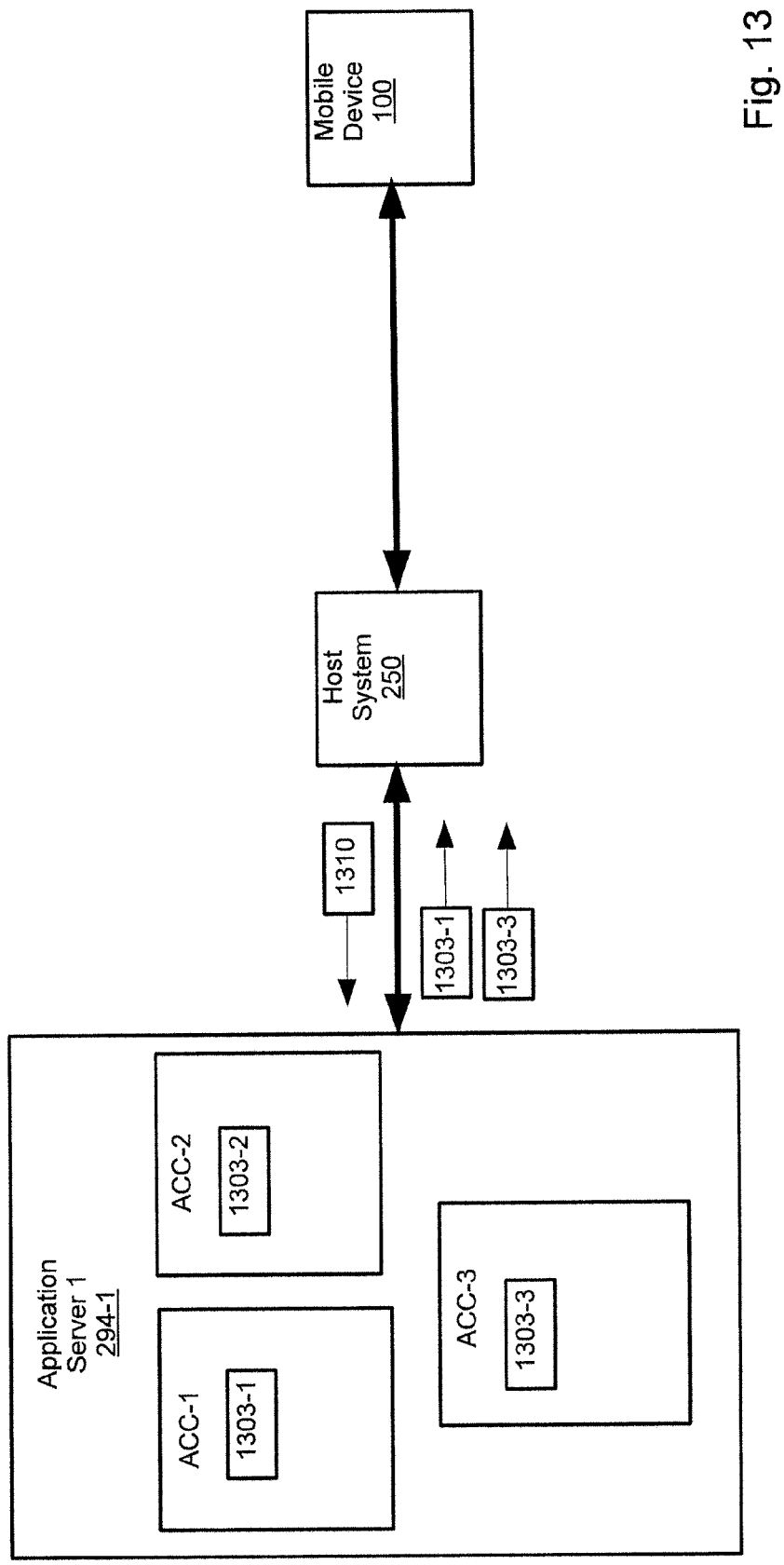
FIG. 13 is a block diagram illustrating components of a communication networking including the application servers and host system of FIG. 4 and the mobile device of FIG. 1.

For example, attention is now directed to FIG. 13, which depicts application server 294-1 in communication with host system 250, which in turn is in communication with mobile device 100. It is appreciated that while not all the infrastructure and additional application servers 294 described above are depicted in FIG. 13, such infrastructure and additional application servers are nonetheless present.

In some implementations, mobile device 100 can request profile pictures 1303-1, 1303-2, 1303-3 (collectively profile pictures 1303, and individually a profile picture 1303), each respectively associated with accounts ACC-1, ACC-2, ACC-3 from application server 294 via at least one request 1310 transmitted to application server 294-1. Applications server 294-1 responds by either transmitting the profile pictures 1303 requested or by transmitting the profile pictures 1303 which have been changed since the last time profile pictures 1303 were requested. Indeed, request 1310 can be transmitted on a periodic basis or as part of a scheduled synchronization event or refresh event. Further, it is appreciated that mobile device 100 can transmit any suitable number of requests for profile pictures 1303, for example one request (similar to request 1310) for each account ACC, in a one-to-one relationship.

However, in other implementations, an application server 294 can be configured to automatically transmit profile pictures 1303 when profile pictures 1303 are updated.

In any event, once profile pictures 1303 are received at mobile device 100, mobile device 100 can incorporate respective profile pictures 1303 into respective icons 1203, and further update icons 1203 as respective profile pictures 1303 are received at mobile device 100.

Figure 14:
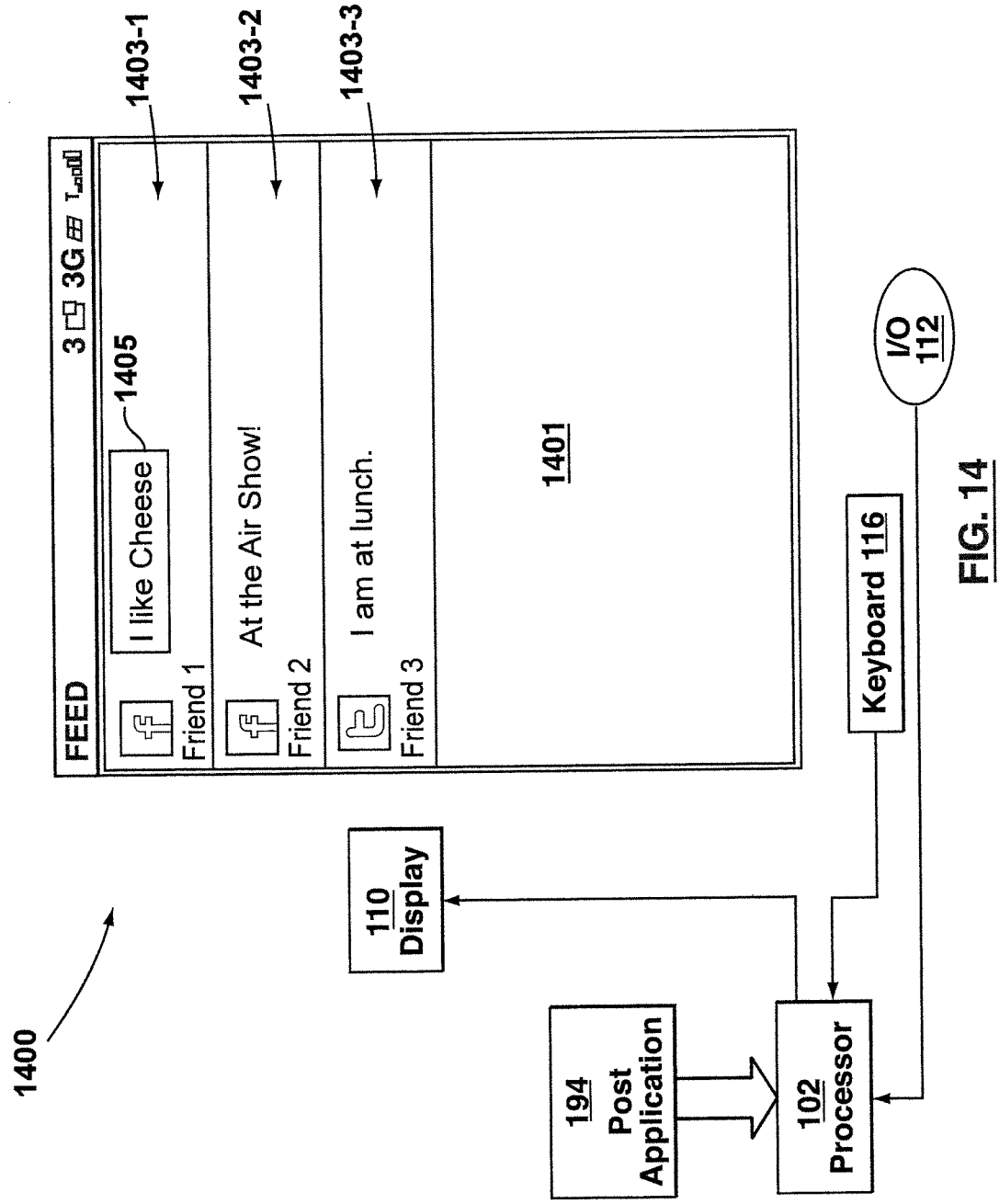
FIG. 14 is an example of a screen generated on the display of the mobile device of FIG. 1.

Attention is now directed to FIG. 14, which is similar to FIG. 8, with like elements having like numbers, however representation 800 has been replaced with representation 1400 of feed application 192. It is appreciated that each account ACC is configured to provide at least one of a news feed, a live feed, an RSS feed or the like to feed application 192, and data from these feeds is provided in a news feed area 1401 of representation 140. FIG. 14 depicts three example items 1403-1, 1403-2, 1403-3 (collectively items 1403, and individually an item 1403) from one or more of accounts ACC, though fewer or more items 1403 could be provided. Furthermore, each item 1403 includes an visual/iconic identifier of a third-party account where the item originated (e.g. an account different from accounts ACC, with an account ACC subscribing to the third-party account). Furthermore, while not depicted, each item 1403 can include at least one of one or more links or one or more pictures.

Figure 15:
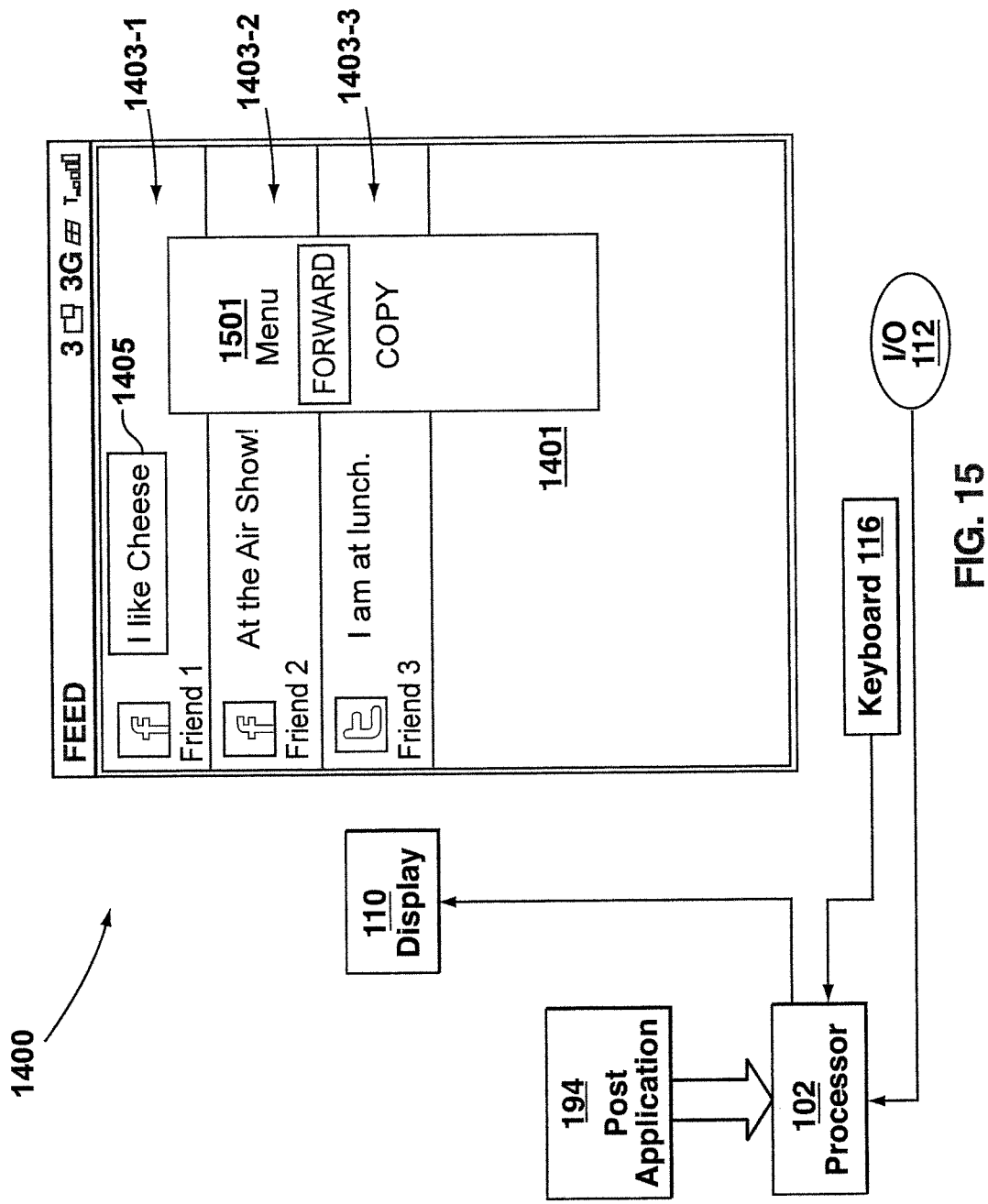
FIG. 15 is an example of the screen of FIG. 14 including a menu.

In any event, one of items 1403 (as depicted item 1403-1) can be selected by receiving input data from auxiliary I/O device 112 indicating the selection, as indicated by box 1405 (though any method for indicating selection is within the scope of present implementations). Once, an item 1403 has been selected, processor 102 can control display 110 to provide a menu 1501 comprising commands for selection which can be executed by processor 102, as depicted in FIG. 15 (substantially similar to FIG. 14, with like elements having like numbers). Menu 1501 can be provided when input data is received at auxiliary I/O 112 indicating that menu 1501 is to be provided (e.g. via a click of a suitable button at mobile device 100, or the like). While only two commands are depicted in FIG. 15, "Forward", and "Copy", menu 1501 can include any suitable number and type of commands.

Figure 16:
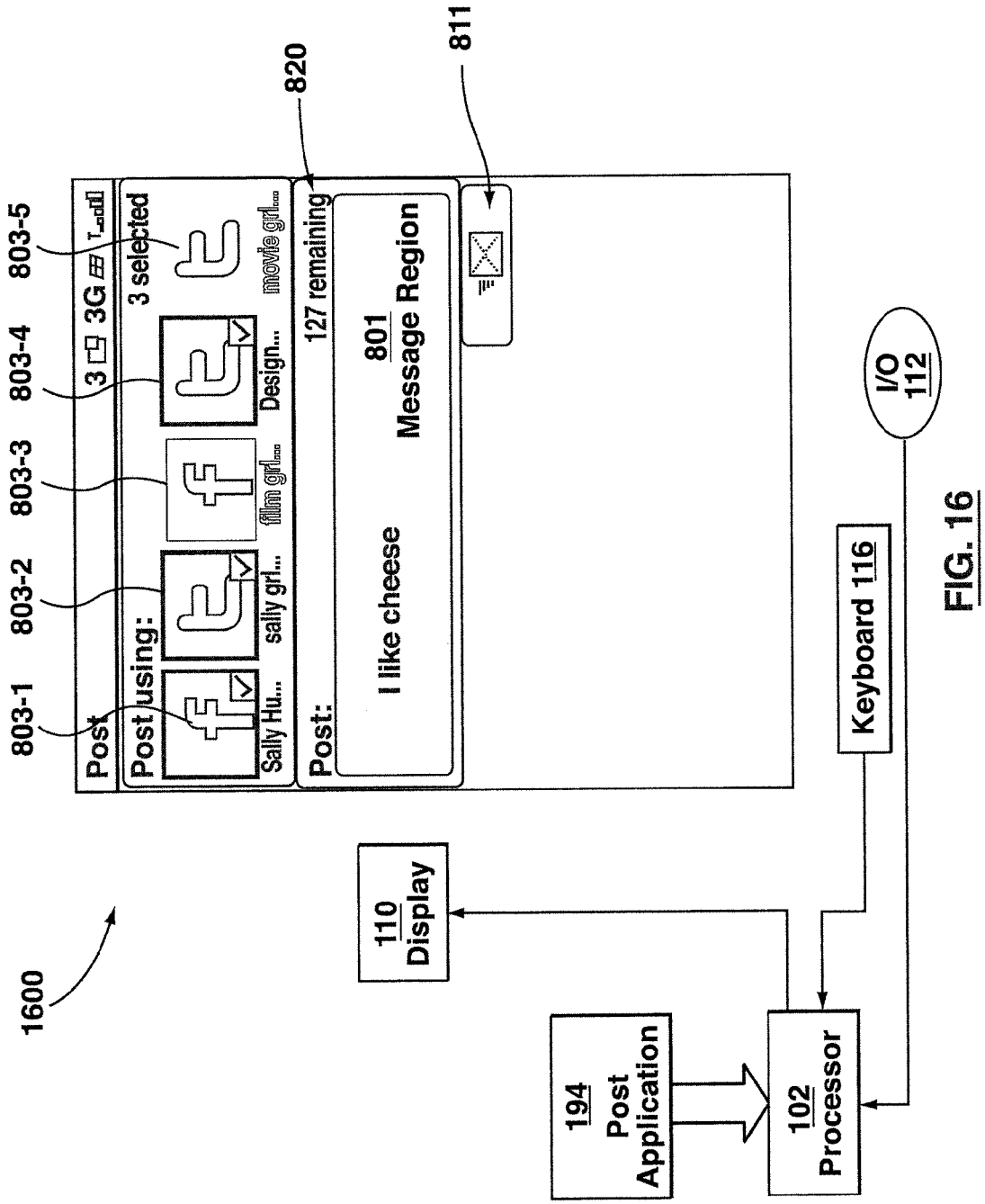
FIG. 16 shows a variation of the screen of FIG. 8, including a field pre-populated from a feed application.

When the command "Forward" is selected, as depicted, processor 102 responds by controlling display 110 to provide a representation 1600 of post application 194, as depicted in FIG. 16 (substantially similar to FIG. 8, with like elements having like numbers), similar to implementations described above. However, in representation 1600 the message area 801 is pre-populated by the same text as in the item 1403-1 being forwarded. Hence the text "I like Cheese" of item 1403-1 is in message region 801. When the item 1403 to be forwarded includes links or pictures, a pre-populated link region 1001 or a pre-populated picture region 1101 can also be provided, each pre-populated by the respective links or pictures in the forwarded item 1403.

Figure 17:
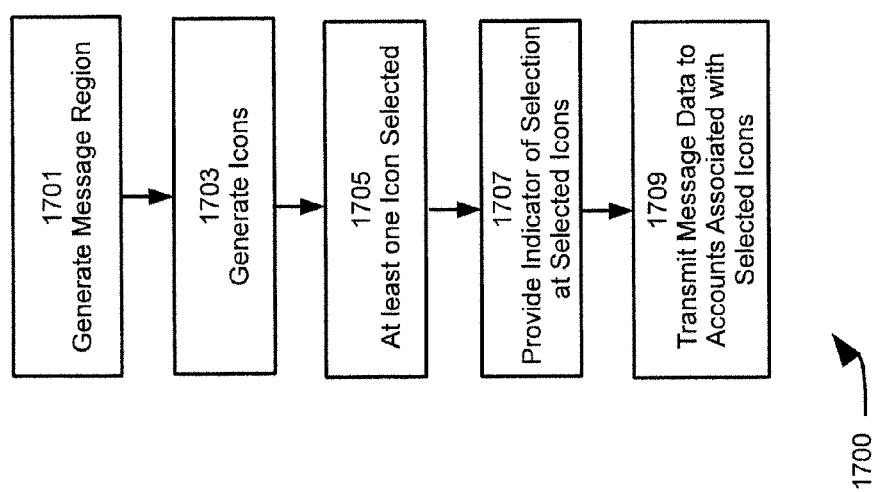
FIG. 17 shows a flowchart depicting a method for posting data to a plurality of accounts.

Attention is now directed to FIG. 17 which depicts a method 1700 for posting data to a plurality of accounts at a plurality of remote servers via a mobile device. In order to assist in the explanation of method 1700, it will be assumed that method 1700 is performed using mobile device 100. Furthermore, the following discussion of method 1700 will lead to a further understanding of mobile device 100 and its various components. However, it is to be appreciated that mobile device 100 and/or method 1700 can be varied, and need not work exactly as discussed herein in conjunction with each other, and that such variations are within the scope of present implementations.

It is furthermore appreciated that method 1700 is implemented at mobile device 100 when post application 194 is executed by processor 102.

At step 1701, processor 102 controls the display 110 to generate the message region 801 for receiving message data to be posted to at least a subset of the plurality of accounts ACC. At step 1703, processor controls the display 110 to generate the icons 803, associated with the plurality of accounts ACC, in a one-to-one relationship. It is appreciated that the icons 803 are provided adjacent to the message region 801. It is further appreciated that each of icons 803 comprises: a first respective indicator 901 of a respective account; a second respective indicator 902 of a service associated with the account; and a respective picture 903, as described above. It is appreciated that steps 1701 and 1703 can be performed in any suitable order, or in parallel.

At step 1705, input data from an input device, such as auxiliary I/O 112, is received the input data indicating that at least one of the icons 803 has been selected. At step 1707, the processor 102 controls the display 110 to provide an indicator 905 of selection at each of the icons 803 which are selected. At step 1709, the message data is transmitted to each of the plurality of accounts ACC associated with each of the icons 803 which are selected. For example the message data is transmitted via the communications subsystem 104 when the virtual button 811 is actuated.

Similarly, processor 102 can control display 110 to provide, adjacent to at least one of the message region 801 or the icons 803, at least one of a region for receiving at least one of link data, picture data, file data, event data, or video data to be posted with the message data. The at least one of the link data, the picture data, the file data, the event data or the video data can be posted to an account ACC when the message data is posted.

As described above, in some implementations a picture in an icon 803 or 1203 can include a picture downloaded from a respective application server 294. In these implementations, method 1700 can further comprise refreshing a picture downloaded from an application server 294 (or a remote server) by querying the application server 294 in a refresh operation or a synchronization operation and receiving a refresh picture in response. Alternatively, method 1700 can further comprise refreshing the picture downloaded from the application server 294 by receiving a refresh picture from the remote server, the refresh picture transmitted by the application server 294 in a refresh operation or a synchronization operation.

In general, method 1700 can further comprise receiving the message data in the message region 801 via an input device; however in some implementations blank message data can be posted, or only a link or only a picture. Hence, receiving message data in message region 801 is generally optional.

Method 1700 can further comprise: receiving messages from at least a second subset of the accounts via the communications subsystem 104, each of the messages received in a respective data feed, for example in feed application 192; controlling the display 110 to provide the messages; receiving selection data from an input device indicating that one of the messages has been selected; and populating the message region 801 with the one of the messages, such that the message data comprises the one of the messages. In other words, message region 801 can also be populated using a forward command executed in the feed application 192, the forward command triggering the processing of the post application 194 and the pre-population of at least one of the message region, the link region 1001 or the picture region 1101 using data selected in the feed application 194.

Figure 18:
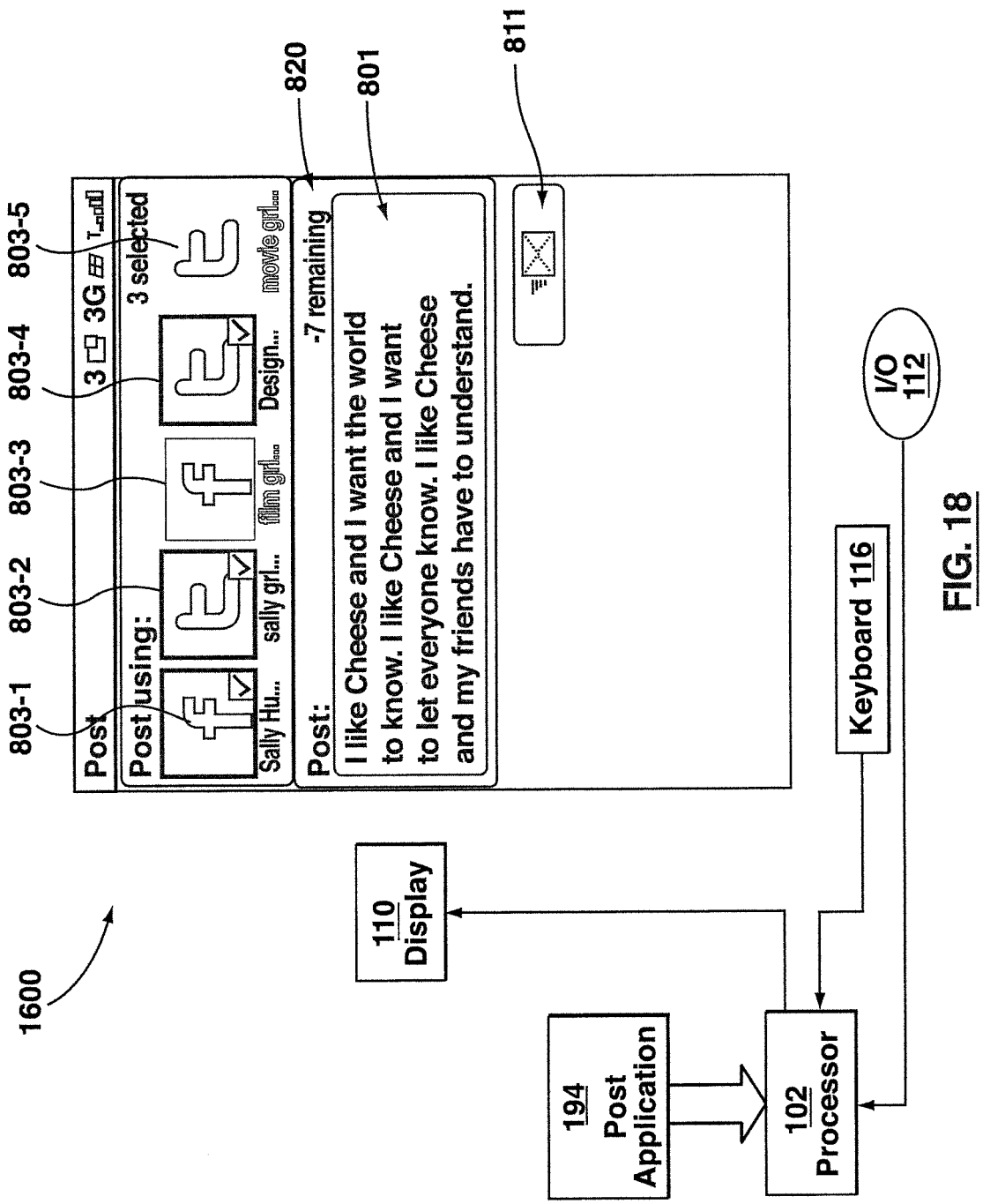
FIG. 18 shows a variation of the screen of FIG. 8.

Attention is now directed to FIG. 18, which is similar to FIG. 16 with like elements having like numbers. However, in these implementations, 147 characters have been received in message region 801, and region 802 has been controlled to indicate that −7 characters are remaining (i.e. there are 7 characters more than the maximum amount for updating to accounts ACC having a 140 character limit). The number of characters exceeding the limit of accounts ACC having the lowest maximum number of characters can be provided using any suitable method (e.g. using text such as "The maximum has been exceeded by 7" can be provided in region 820).

Furthermore it is appreciated that icons 803-2 and 803-4 are automatically unselected when the maximum number of characters for associated accounts are exceeded in message region 801 as an attempt to post more than 140 characters to these accounts would result in either an error or a nonsensical truncation of the message data. The automatic unselection of icons 803-2 and 803-4 is reflected by icons 803-2 and 803-4 being changed to an unselected state (e.g. by way of the checkmark being removed and associated text and picture being grayed out or ghosted, or icons 803-2 and 803-4 being disabled). Hence, in general, when associated maximum character limits are reached for each account ACC, an associated selected icon 803 is changed from a selected state to an unselected state. Furthermore, unselected icons associated with the same service are disabled from being selected. Furthermore, it is appreciated that when the number of characters in message area 801 is reduced to being within a maximum amount associated with a respective account ACC, the associated icon(s) 803 can be changed back to a selected state. Alternatively, the associated icons(s) 803 can be reenabled for selection: in these implementations, for the message data to be posted to accounts ACC associated with icons 803 that were previously changed from a selected state to an unselected state, the associated icons 803 are re-selected by receiving suitable input data.

It is further understood that while implementations of FIGS. 8 through 18 have been described with reference to mobile device 100, with input data being received via auxiliary I/O 112, further implementations can be implemented on mobile device 100a or mobile device 100b with input data being received via at least one of touch-pad 112b-1 or touch-screen 112b-2.

Those skilled in the art will appreciate that in some implementations, the functionality of mobile devices 100, 100a, 100b can be implemented using pre-programmed hardware or firmware elements (e.g., application specific integrated circuits (ASICs), electrically erasable programmable read-only memories (EEPROMs), etc.), or other related components. In other implementations, the functionality of mobile devices 100, 100a, 100b can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. Variations, subsets, enhancements and combinations of the foregoing are contemplated.

The invention claimed is:

1. A method for posting data to at least one of a plurality of accounts at a plurality of remote servers via a mobile device comprising a processor interconnected with a display, an input device and a communication subsystem, the method comprising:
controlling said display to generate a message region for receiving message data to be posted to at least a subset of said plurality of accounts;
controlling said display to generate icons, associated with said plurality of accounts, in a one-to-one relationship, said icons provided adjacent to said message region, each said icon comprising: a first respective indicator of a respective account; a second respective indicator of a service associated with said respective account; and a respective picture associated with said respective account;
receiving input data from said input device indicating that at least one of said icons has been selected;
controlling said display to provide an indicator of selection at each of said icons which are selected; and
transmitting said message data to each of said plurality of accounts associated with each of said icons which are selected via said communication subsystem, wherein each of said plurality of accounts is associated with a respective maximum number of characters that can be uploaded to each said account, said method further comprising:
receiving said data in said message region as textual characters; and, as each said respective maximum number of characters is exceeded, changing selected icons associated with each said respective maximum number from a selected state to an unselected state.

2. The method of claim 1, wherein each respective picture comprises at least one of:
a picture stored at said mobile device; and,
a picture downloaded from a remote server associated with said respective account.

3. The method of claim 2, further comprising refreshing said picture downloaded from said remote server by at least one of:
querying said remote server in a refresh operation and receiving a refresh picture in response; and
receiving a refresh picture from said remote server, said refresh picture transmitted by said remote server in a refresh operation.

4. The method of claim 1, wherein said first respective indicator comprises a textual indicator of a name of said respective account provided adjacent to said respective picture.

5. The method of claim 1, wherein said second respective indicator comprises at least one of said respective picture and a visual indicator inset in said respective picture.

6. The method of claim 1, wherein said indicator of selection comprises at least one of:
a visual difference between selected icons and unselected icons;
a visual indicator inset in said second respective picture;
a border surrounding said respective picture; or
said respective picture for selected icons provided with an original color scheme, wherein pictures for unselected icons are provided with a changed color scheme.

7. The method of claim 1, further comprising receiving said message data in said message region via said input device.

8. The method of claim 1, further comprising:
receiving messages from at least a second subset of said accounts via said communication subsystem, each of said messages received in a respective data feed;
controlling said display to provide said messages;
receiving selection data from said input device indicating that one of said messages has been selected via said input device; and
populating said message region with said one of said messages, such that said message data comprises said one of said messages.

9. The method of claim 1, further comprising:
controlling said display to provide, adjacent to at least one of said message region or said icons, a region for receiving at least one of link data, picture data, file data, event data, or video data; and
posting at least one of said link data, said picture data, said file data, said event data, or said video data for upload with said message data.

10. The method of claim 1, further comprising preventing unselected icons associated with an exceeded maximum number of characters from being selected.

11. The method of claim 1, wherein each of said plurality of servers comprises at least one of a social networking server, an RSS (real simple syndication) server, or a news server.

12. A mobile device for posting data to at least one of a plurality of accounts at a plurality of remote servers, the mobile device comprising:
a processor interconnected with a display, an input device and a communication subsystem, said processor configured to:
control said display to generate a message region for receiving message data to be posted to at least a subset of said plurality of accounts;
control said display to generate icons, associated with said plurality of accounts, in a one-to-one relationship, said icons provided adjacent to said message region, each said icon comprising: a first respective indicator of a respective account; a second respective indicator of a service associated with said respective account; and a respective picture associated with said respective account;
receive input data from said input device indicating that at least one of said icons has been selected;
control said display to provide an indicator of selection at each of said icons which are selected; and
transmit said message data to each of said plurality of accounts associated with each of said icons which are selected via said communication subsystem, wherein each of said plurality of accounts is associated with a respective maximum number of characters that can be uploaded to each said account, and wherein said processor is further configured to:
receive said data in said message region as textual characters; and, as each said respective maximum number of characters is exceeded, change selected icons associated with each said respective maximum number from a selected state to an unselected state.

13. The mobile device of claim 12, wherein each respective picture comprises at least one of:
   a picture stored at said mobile device; and,
   a picture downloaded from a remote server associated with said respective account.

14. The mobile device of claim 13, wherein said processor is further configured to refresh said picture downloaded from said remote server by at least one of:
   querying said remote server in a refresh operation and receiving a refresh picture in response; and
   receiving a refresh picture from said remote server, said refresh picture transmitted by said remote server in a refresh operation.

15. The mobile device of claim 12, wherein said first respective indicator comprises a textual indicator of a name of said respective account provided adjacent to said respective picture.

16. The mobile device of claim 12, wherein said second respective indicator comprises at least one of said respective picture and a visual indicator inset in said respective picture.

17. The mobile device of claim 12, wherein said indicator of selection comprises at least one of:
   a visual difference between selected icons and unselected icons;
   a visual indicator inset in said second respective picture;
   a border surrounding said respective picture; or
   said respective picture for selected icons provided with an original color scheme, wherein pictures for unselected icons are provided with a changed color scheme.

18. The mobile device of claim 12, wherein said processor is further configured to receive said message data in said message region via said input device.

19. The mobile device of claim 12, wherein said processor is further configured to:
   receive messages from at least a second subset of said accounts via said communication subsystem, each of said messages received in a respective data feed;
   control said display to provide said messages;
   receive selection data from said input device indicating that one of said messages has been selected via said input device; and
   populate said message region with said one of said messages, such that said message data comprises said one of said messages.

20. The mobile device of claim 12, wherein said processor is further configured to:
   control said display to provide, adjacent to at least one of said message region or said icons, a region for receiving at least one of link data, picture data, file data, event data, or video data; and
   post at least one of said link data, said picture data, said file data, said event data, or said video data for upload with said message data.

21. The mobile device of claim 12, wherein said processor is further configured to prevent unselected icons associated with an exceeded maximum number of characters from being selected.

22. The mobile device of claim 12, wherein each of said plurality of servers comprises at least one of a social networking server, an RSS (real simple syndication) server, or a news server.

23. A system for posting data to at least one of a plurality of accounts, the system comprising:
   a plurality of remote servers, said plurality of accounts associated with said plurality of servers; and
   a mobile hardware device in communication with said plurality of servers, said mobile hardware device configured to:
      control an associated display to generate a message region for receiving message data to be posted to at least a subset of said plurality of accounts;
      control said display to generate icons, associated with said plurality of accounts, in a one-to-one relationship, said icons provided adjacent to said message region, each said icon comprising: a first respective indicator of a respective account; a second respective indicator of a service associated with said respective account; and a respective picture associated with said respective account;
      receive input data from said input device indicating that at least one of said icons has been selected;
      control said display to provide an indicator of selection at each of said icons which are selected; and
      transmit said message data to each of said plurality of accounts associated with each of said icons which are selected via an associated communication subsystem, wherein each of said plurality of accounts is associated with a respective maximum number of characters that can be uploaded to each said account, and wherein said mobile hardware device is further configured to:
         receive said data in said message region as textual characters; and, as each said respective maximum number of characters is exceeded, change selected icons associated with each said respective maximum number from a selected state to an unselected state.

24. A computer program product, comprising a non-transitory computer usable medium having a computer readable program code adapted to be executed to implement a method for posting data to at least one of a plurality of accounts at a plurality of remote servers via a mobile device comprising a processor interconnected with a display, an input device and a communication subsystem, comprising:
   controlling said display to generate a message region for receiving message data to be posted to at least a subset of said plurality of accounts;
   controlling said display to generate icons, associated with said plurality of accounts, in a one-to-one relationship, said icons provided adjacent to said message region, each said icon comprising: a first respective indicator of a respective account; a second respective indicator of a service associated with said respective account; and a respective picture associated with said respective account, wherein said first respective indicator, said second respective indicator and said respective picture are different from each other;
   receiving input data from said input device indicating that at least one of said icons has been selected;
   controlling said display to provide an indicator of selection at each of said icons which are selected; and
   transmitting said message data to each of said plurality of accounts associated with each of said icons which are selected via said communication subsystem, wherein each of said plurality of accounts is associated with a respective maximum number of characters that can be uploaded to each said account, said method further comprising:

receiving said data in said message region as textual characters; and, as each said respective maximum number of characters is exceeded, changing selected icons associated with each said respective maximum number from a selected state to an unselected state.

* * * * *